(12) United States Patent
Karov et al.

(10) Patent No.: US 9,886,950 B2
(45) Date of Patent: Feb. 6, 2018

(54) AUTOMATIC GENERATION OF DOMAIN MODELS FOR VIRTUAL PERSONAL ASSISTANTS

(71) Applicant: Intel Corporation, Santa Clara, CA (US)

(72) Inventors: Yael Karov, Tel Aviv (IL); Eran Levy, Tel Aviv (IL); Sari Brosh-Lipstein, Kiryat Ono (IL)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 14/479,949

(22) Filed: Sep. 8, 2014

(65) Prior Publication Data

US 2015/0073798 A1  Mar. 12, 2015

Related U.S. Application Data

(60) Provisional application No. 61/875,052, filed on Sep. 8, 2013, provisional application No. 61/937,673, filed on Feb. 10, 2014.

(51) Int. Cl.
| | |
|---|---|
| *G06F 17/00* | (2006.01) |
| *G10L 15/197* | (2013.01) |
| *G06F 17/27* | (2006.01) |
| *G06F 17/30* | (2006.01) |

(52) U.S. Cl.
CPC .......... *G10L 15/197* (2013.01); *G06F 17/277* (2013.01); *G06F 17/2775* (2013.01); *G06F 17/2785* (2013.01); *G06F 17/30731* (2013.01)

(58) Field of Classification Search
None
See application file for complete search history.

(56) References Cited

U.S. PATENT DOCUMENTS

| | | | | |
|---|---|---|---|---|
| 6,473,754 | B1 * | 10/2002 | Matsubayashi | ..... G06F 17/3061 |
| 8,296,317 | B2 * | 10/2012 | Ghosh | ..................... G06F 17/30 |
| | | | | 707/763 |
| 8,433,715 | B1 * | 4/2013 | Mirhaji | ............. G06F 17/30312 |
| | | | | 707/756 |
| 8,554,618 | B1 * | 10/2013 | Gasch | ................ G06Q 30/0241 |
| | | | | 705/14.4 |
| 8,700,404 | B1 * | 4/2014 | Chotimongkol | .... G10L 15/1815 |
| | | | | 704/255 |

(Continued)

*Primary Examiner* — Fariba Sirjani
(74) *Attorney, Agent, or Firm* — Barnes & Thornburg LLP

(57) ABSTRACT

Technologies for automatic domain model generation include a computing device that accesses an n-gram index of a web corpus. The computing device generates a semantic graph of the web corpus for a relevant domain using the n-gram index. The semantic graph includes one or more related entities that are related to a seed entity. The computing device performs similarity discovery to identify and rank contextual synonyms within the domain. The computing device maintains a domain model including intents representing actions in the domain and slots representing parameters of actions or entities in the domain. The computing device performs intent discovery to discover intents and intent patterns by analyzing the web corpus using the semantic graph. The computing device performs slot discovery to discover slots, slot patterns, and slot values by analyzing the web corpus using the semantic graph. Other embodiments are described and claimed.

25 Claims, 6 Drawing Sheets

(56) References Cited

U.S. PATENT DOCUMENTS

| | | | | |
|---|---|---|---|---|
| 8,775,459 B2* | 7/2014 | Houck | G06F 17/30654 |
| | | | 707/768 |
| 8,793,261 B2* | 7/2014 | Jiang | G06F 17/30616 |
| | | | 704/9 |
| 8,831,928 B2* | 9/2014 | Marcu | G06F 17/289 |
| | | | 701/1 |
| 8,843,493 B1* | 9/2014 | Liao | G06F 17/30985 |
| | | | 707/737 |
| 8,869,019 B1* | 10/2014 | Sampath-Kumar | G06F 17/3089 |
| | | | 715/208 |
| 8,935,260 B2* | 1/2015 | Zhou | G06F 17/2705 |
| | | | 707/748 |
| 8,954,425 B2* | 2/2015 | Xiao | G06F 17/30241 |
| | | | 707/724 |
| 9,069,750 B2* | 6/2015 | Zuev | G06F 17/27 |
| 9,292,492 B2* | 3/2016 | Sarikaya | G06F 17/279 |
| 9,342,588 B2* | 5/2016 | Balchandran | G06F 17/30705 |
| 9,454,525 B2* | 9/2016 | Balchandran | G06F 17/2715 |
| 2003/0182102 A1* | 9/2003 | Corston-Oliver | G06F 17/2881 |
| | | | 704/9 |
| 2006/0253427 A1* | 11/2006 | Wu | G06F 17/3064 |
| 2007/0226796 A1* | 9/2007 | Gilbert | G06F 21/55 |
| | | | 726/22 |
| 2009/0150156 A1* | 6/2009 | Kennewick | G06Q 30/0261 |
| | | | 704/257 |
| 2009/0193328 A1* | 7/2009 | Reis | G06F 17/30719 |
| | | | 715/231 |
| 2009/0292685 A1* | 11/2009 | Liu | G06F 17/30817 |
| 2010/0161314 A1* | 6/2010 | Karttunen | G06F 17/2775 |
| | | | 704/9 |
| 2010/0161639 A1* | 6/2010 | Bobrow | G06F 17/2775 |
| | | | 707/759 |
| 2010/0228693 A1* | 9/2010 | Dawson | G06F 17/2705 |
| | | | 706/12 |
| 2011/0022940 A1* | 1/2011 | King | G06F 17/30011 |
| | | | 715/229 |
| 2011/0055186 A1* | 3/2011 | Gopalakrishnan | G06F 17/30867 |
| | | | 707/706 |
| 2011/0238410 A1* | 9/2011 | Larcheveque | G06F 17/2785 |
| | | | 704/9 |
| 2011/0320187 A1* | 12/2011 | Motik | G06F 17/278 |
| | | | 704/9 |
| 2012/0158636 A1* | 6/2012 | Bowers | G06N 5/02 |
| | | | 706/50 |
| 2012/0197631 A1* | 8/2012 | Ramani | G06F 17/2755 |
| | | | 704/9 |
| 2013/0031126 A1* | 1/2013 | Setlur | G06F 17/30554 |
| | | | 707/769 |
| 2013/0144875 A1* | 6/2013 | Hagiwara | G06F 17/3053 |
| | | | 707/731 |
| 2013/0238621 A1* | 9/2013 | Ganjam | G06F 17/30864 |
| | | | 707/737 |
| 2013/0275441 A1* | 10/2013 | Agrawal | G06F 17/30616 |
| | | | 707/749 |
| 2014/0040233 A1* | 2/2014 | Ozonat | G06F 17/30867 |
| | | | 707/709 |
| 2014/0040297 A1* | 2/2014 | Ozonat | G06F 17/30616 |
| | | | 707/758 |
| 2014/0214858 A1* | 7/2014 | Ozonat | G06F 17/30731 |
| | | | 707/748 |
| 2014/0236570 A1* | 8/2014 | Heck | G06F 17/30654 |
| | | | 704/9 |
| 2014/0365880 A1* | 12/2014 | Bellegarda | G06F 17/3097 |
| | | | 715/261 |
| 2014/0379326 A1* | 12/2014 | Sarikaya | G10L 15/18 |
| | | | 704/9 |
| 2015/0032443 A1* | 1/2015 | Karov | G06F 17/2785 |
| | | | 704/9 |
| 2015/0073798 A1* | 3/2015 | Karov | G10L 15/197 |
| | | | 704/245 |
| 2015/0363171 A1* | 12/2015 | Esfahany | G06F 8/30 |
| | | | 717/106 |
| 2016/0203130 A1* | 7/2016 | Roque | G06F 17/30684 |
| | | | 707/741 |

* cited by examiner

AUTOMATIC GENERATION OF DOMAIN MODELS FOR VIRTUAL PERSONAL ASSISTANTS

CROSS-REFERENCE TO RELATED U.S. PATENT APPLICATION

The present application claims priority under 35 U.S.C. § 119(e) to U.S. Provisional Patent Application Ser. No. 61/875,052, entitled "PERSONAL ASSISTANT PLATFORM," which was filed on Sep. 8, 2013, and to U.S. Provisional Patent Application Ser. No. 61/937,673, entitled "SYSTEM AND METHODS FOR AUTOMATING PROCESSES OF VIRTUAL PERSONAL ASSISTANT CREATION WITH A PERSONAL ASSISTANT PLATFORM," which was filed on Feb. 10, 2014.

BACKGROUND

As smart mobile devices become widespread and ubiquitous, natural language interactions are becoming popular for daily functionalities such as information retrieval, shopping assistance, reservations, ticketing, social-media postings, correspondence, note-taking and time-management. Some devices may include a virtual personal assistant (VPA) to provide a natural language interface to those functionalities. A typical VPA includes or references a domain model that defines the potential actions and parameters that may be included in a natural language request. Generating the domain model for a VPA typically includes several time-consuming manual stages. For example, natural language templates representing the available actions in the relevant domain (also known as intents) and associated parameters (also known as slots) may be generated manually, or a semantic web representing key terms in the relevant domain may be generated manually.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
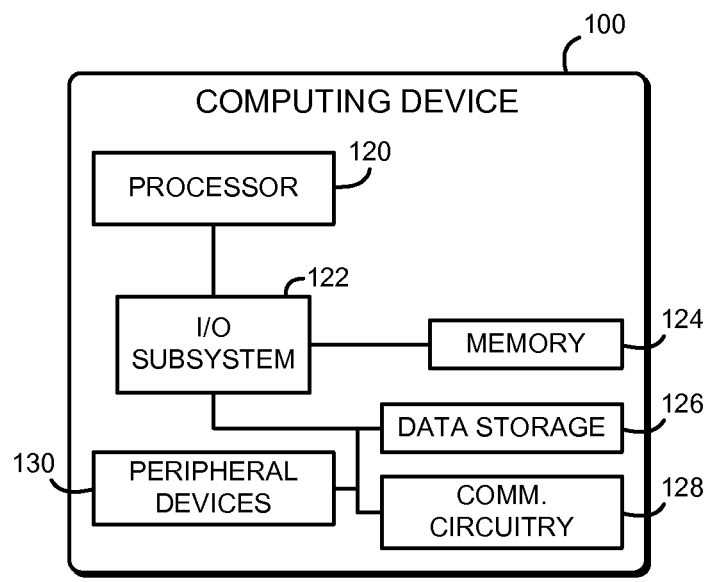
FIG. 1 is a simplified block diagram of at least one embodiment of a computing device for automatically generating a domain model.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for automatic domain model generation is shown. In use, the computing device 100 indexes a large web corpus by n-gram and by frequency of each n-gram, wherein "n" is an integer and an "n-gram" is a sequence of "n" entities such as words and/or punctuation characters selected from the web corpus. To generate a domain model, a user may supply a small number of key terms (e.g., 1-10 key terms) from the relevant domain as seed entities. The computing device 100 analyzes the web corpus to generate a semantic graph including one or more relevant entities that are grammatically linked to a seed entity. The computing device 100 may analyze the semantic graph to identify synonyms or other terms similar to the seed entity. Those similar terms may be used to further expand the semantic graph. The computing device 100 may discover one or more desired user actions in the relevant domain and may discover one or more feature templates associated with the user action. The computing device 100 may discover one or more parameters associated with actions or entities in the relevant domain, and may discover one or more feature templates and/or potential values associated with the parameters. Thus, the computing device 100 may automate much of the manual labor typically required to generate a domain model for a virtual personal assistant for the relevant domain. The computing device 100 may present automatically generated actions, parameters, and associated templates to a user for approval. Manual approval may be much faster and easier than manual template generation.

The computing device 100 may be embodied as any type of device capable of performing the functions described herein. For example, the computing device 100 may be embodied as, without limitation, a smartphone, a cellular phone, a tablet computer, a notebook computer, a laptop computer, a desktop computer, a workstation, a server computing device, a distributed computing system, a multiprocessor system, a consumer electronic device, a smart appliance, and/or any other computing device capable of processing natural language requests. As shown in FIG. 1, the illustrative computing device 100 includes a processor 120, an I/O subsystem 122, memory 124, and a data storage device 126. Of course, the computing device 100 may include other or additional components, such as those commonly found in a portable computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store the web corpus, n-gram index, semantic graph, domain model, or other data used for automatic domain model generation.

The computing device 100 further includes communication circuitry 128, which may be embodied as any communication circuit, device, or collection thereof, capable of enabling communications between the computing device 100 and other remote devices. The communication circuitry 128 may be configured to use any one or more communication technology (e.g., wireless or wired communications) and associated protocols (e.g., Ethernet, Bluetooth®, Wi-Fi®, WiMAX, etc.) to effect such communication.

In some embodiments, the computing device 100 may also include one or more peripheral devices 130. The peripheral devices 130 may include any number of additional input/output devices, interface devices, and/or other peripheral devices. For example, the peripheral devices 130 may include typical input/output devices such as a display, keyboard, and/or touchscreen, or other peripheral devices.

Figure 2:
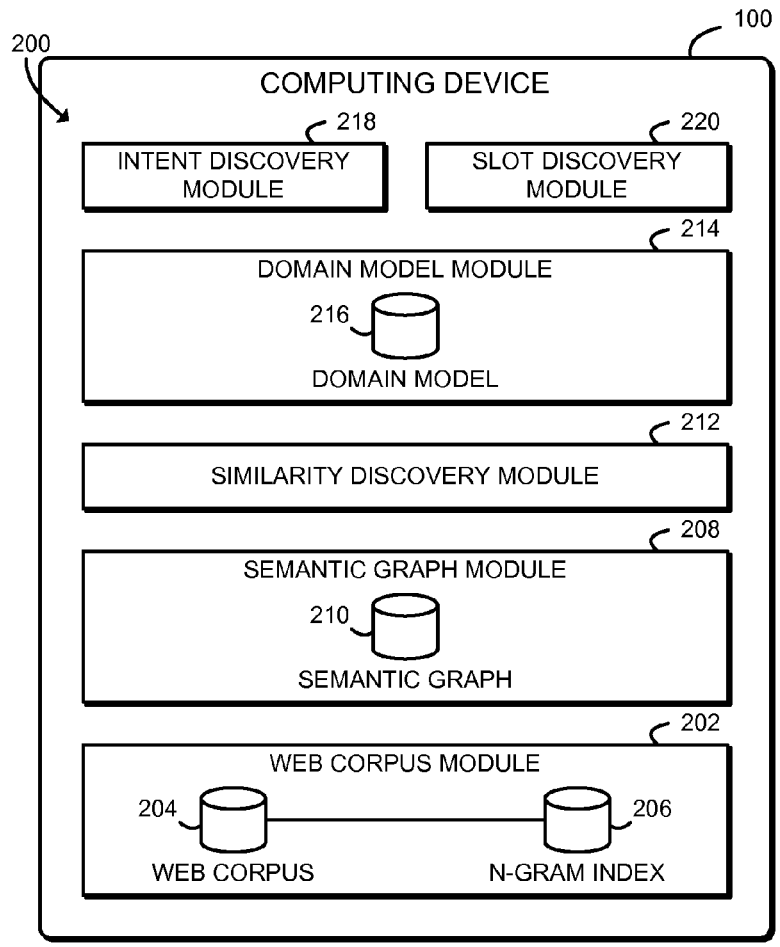
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative environment 200 includes a web corpus module 202, a semantic graph module 208, a similarity discovery module 212, a domain model module 214, an intent discovery module 218, and a slot discovery module 220. The various modules of the environment 200 may be embodied as hardware, firmware, software, or a combination thereof. For example, each of the modules, logic, and other components of the environment 200 may form a portion of, or otherwise be established by, the processor 120 or other hardware components of the computing device 100.

The web corpus module 202 is configured to access a web corpus 204 using an n-gram index 206. The web corpus 204 includes a large number of web pages, natural language user interactions, or other existing natural language documents. The n-gram index 206 is a searchable index of the web corpus 204. The n-gram index 206 analyzes and searches the n-grams included in the web corpus 204. Each n-gram may be embodied as a sequence of a predefined number of entities (e.g., words or phrases) extracted from the web corpus 204. The n-gram index 206 also maintains the number of occurrences (frequency) associated with each n-gram in the web corpus 204. Although illustrated as including the web corpus 204 and the n-gram index 206, in some embodiments the web corpus module 202 may access the web corpus 204 and/or the n-gram index 206 remotely over one or more network connections. For example, in some embodiments, the web corpus module 202 may crawl the web to remotely access the web corpus 204 and store the resulting n-gram index 206 locally. In some embodiments, the web corpus module 202 may access the n-gram index 206 without having access to the web corpus 204 itself.

The semantic graph module 208 is configured to generate a semantic graph 210 of the web corpus 204 using the n-gram index 206. The generated semantic graph 210 includes one or more grammatical entities selected from the web corpus 204 that are related to the seed entity (known as "related entities"). The semantic graph module 208 generates the semantic graph 210 rooted by, surrounding, or otherwise starting from an input seed entity. In the illustrative embodiment, the seed entity is a key noun or noun phrase in the relevant domain, and may be supplied by a user of the computing device 100. For example, when developing a virtual personal assistant in the movie ticket ordering domain, the seed entity may be the noun "movie." Additionally or alternatively, in some embodiments the seed entity may be of a different grammatical type, such as a verb or an adjective. The semantic graph module 208 may be configured to expand the semantic graph 210 iteratively, for example by using a noun of the semantic graph 210 as an additional seed entity.

The similarity discovery module 212 is configured to discover additional key terms in the relevant domain based on the seed entity, using the semantic graph 210. The similarity discovery module 212 may identify and score synonyms or other related entities based on their similarity to the seed entity. The similarity discovery module 212 is also configured to analyze and score entities provided by other modules of the environment 200 for similarity. For example, the similarity discovery module 212 may score entities provided by the intent discovery module 218 and/or the slot discovery module 220.

The domain model module 214 is configured to manage a domain model 216. The domain model 216 includes sets of one or more intents and one or more slots. Intents represent actions that a user may request be performed on an entity in the relevant domain. For example, for a movie domain, the intents may include an intent to "watch a movie." Slots represent parameters for actions or entities. For example, the "watch a movie" intent may be associated with a "movie" slot corresponding to the particular movie to be watched. Each intent and slot may be associated with one or more intent patterns or slot patterns, respectively. Patterns are query features that may be matched against a natural language request to identify the intent and/or slots included in the requests. Patterns may include linguistic patterns, n-gram patterns, co-occurrence patterns, or any other pattern of query features. For example, the "watch a movie" intent may be associated with the pattern "watch+movie," which is a linguistic intent pattern matching the verb "watch" grammatically linked with the noun "movie." Slot patterns may include tags indicating the presence of a slot value. For example, the pattern "movie directed by a DIRECTOR" may be an n-gram slot pattern associated with a "director" slot. The tag "DIRECTOR" may be replaced by a slot value for the director slot (i.e., the name of a director). The domain model 216 further may include an ontology of relevant slot values and a set of similarity groups (i.e., words that are synonymous within the relevant domain). In some embodiments, some or all of the ontology of slot values and/or the similarity groups may be predefined.

The intent discovery module 218 is configured to discover new intents and intent patterns in the relevant domain using the semantic graph 210 and the n-gram index 206. The intent discovery module 218 may discover new intent patterns for known intents in the domain model 216. The intent discovery module 218 may also discover new intents and associated intent patterns. The intent discovery module 218 may add the newly discovered intents and intent patterns to the domain model 216 automatically, or may present the newly discovered intents and intent patterns to a user for review.

The slot discovery module 220 is configured to discover new slots, slot patterns, and slot values in the relevant domain using the semantic graph 210 and the n-gram index 206. The slot discovery module 220 may discover new slot patterns and/or new slot values for known slots in the domain model 216. The slot discovery module 220 may also discover new slots and associated slot patterns and slot values. The slot discovery module 220 may add the newly discovered slots, slot patterns, and slot values to the domain model 216 automatically, or may present the newly discovered slots, slot patterns, and slot values to a user for review.

Figure 3:
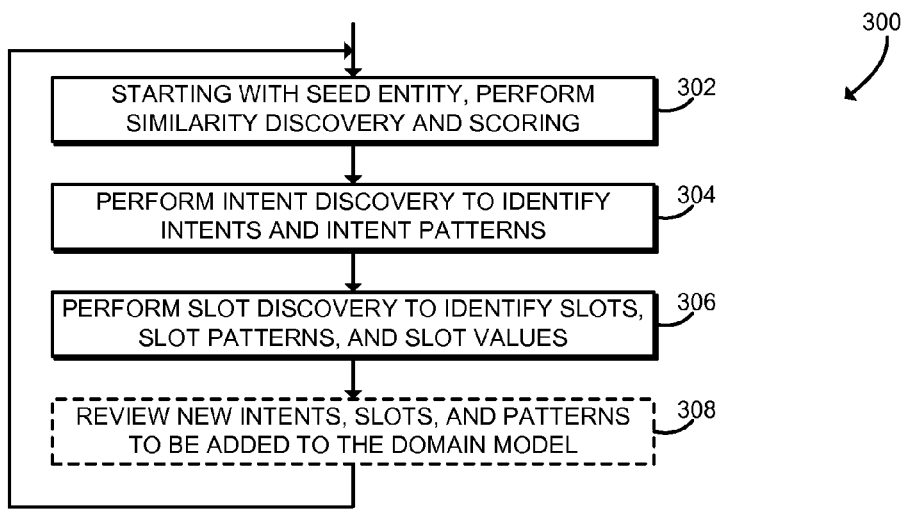
FIG. 3 is a simplified flow diagram of at least one embodiment of a method for automatic domain model generation that may be executed by the computing device of FIGS. 1 and 2.

Referring now to FIG. 3, in use, the computing device 100 may execute a method 300 for automatic domain model generation. The method 300 begins with block 302, in which the computing device 100, starting with a seed entity, performs similarity discovery and scoring. Similarity discovery and scoring identifies entities in the web corpus 204 that are similar to the seed entity and may rank those similar entities. Thus, similarity scoring may identify key terms in a domain and may be used to expand the domain model 216 to include synonyms or other related entities. The seed entity may be embodied as any key term or key phrase related to the domain for which the domain model 216 is to be generated. For example, to prepare a movie ticket ordering domain model 216, the seed entity may be embodied as "movie." The seed entity may be predefined or otherwise supplied by a user or other human interacting with the computing device 100. In some embodiments, the seed entity may be selected from the web corpus 204 or from a predefined domain model 216. Methods for similarity discovery and scoring are described further below in connection with FIG. 5.

In block 304, the computing device 100 performs intent discovery to identify new intents and new intent patterns for existing intents, based on the web corpus 204. As described above, an intent represents an action that the user wants performed on an entity. An intent pattern represents query features that may be used to identify an intent in a natural language request. Each intent may be associated with one or more intent patterns. Each intent pattern may be embodied as a linguistic pattern, a co-occurrence pattern, an n-gram pattern, or any other pattern that may be matched against a natural language request. As an example, a "movie" domain may include an intent to play a movie. The "play a movie" intent may be associated with a linguistic intent pattern represented as "watch+movie," indicating that the verb "watch" is grammatically linked to the noun "movie." Methods for intent and intent pattern discovery are described further below in connection with FIG. 6.

In block 306, the computing device 100 performs slot discovery to identify new slots, new slot patterns for existing slots, and new slot values. As described above, a slot represents a parameter of an action or an entity. For example, an intent may be associated with several slots representing various parameters of the action requested by the user. A slot pattern represents query features that may be used to identify a slot in a natural language request. Each slot may be associated with one or more slot patterns. Similar to intent patterns, each slot pattern may be embodied as a linguistic pattern, a co-occurrence pattern, an n-gram pattern, or any other pattern that may be matched against a natural language request. Slot patterns may also include one or more tags that may be substituted with slot values in a natural language request. As described above, known slot values may be stored in an ontology of the domain model 216. As an example, the "movie" domain may include a slot for the director associated with a movie. The director slot may be associated with an n-gram pattern represented as "movie directed by DIRECTOR." The tag "DIRECTOR" may be replaced by slot values, for example the names of known directors in the ontology of the domain model 216 (e.g., Welles, Hitchcock).

In block 308, in some embodiments, the computing device 100 may allow a user to review new intents, slots, patterns, and slot values that are to be added to the domain model 216. User review of new additions to the domain model 216 may be substantially faster than manual definition of the intents, slots, patterns, and slot values. After updating the domain model 216, the method 300 loops back to block 302, to continue performing similarity discovery, intent discovery, and slot discovery. Thus, the domain model 216 may be expanded and/or refined iteratively.

Although illustrated as proceeding sequentially, it should be understood that the processes described in FIG. 3 may be performed at different times or in other orders, for example in parallel or asynchronously. For example, each of semantic discovery, intent discovery, and slot discovery may be performed independently. Additionally, in some embodiments, a user may also perform manual additions or revisions to the domain model 216.

Figure 4:
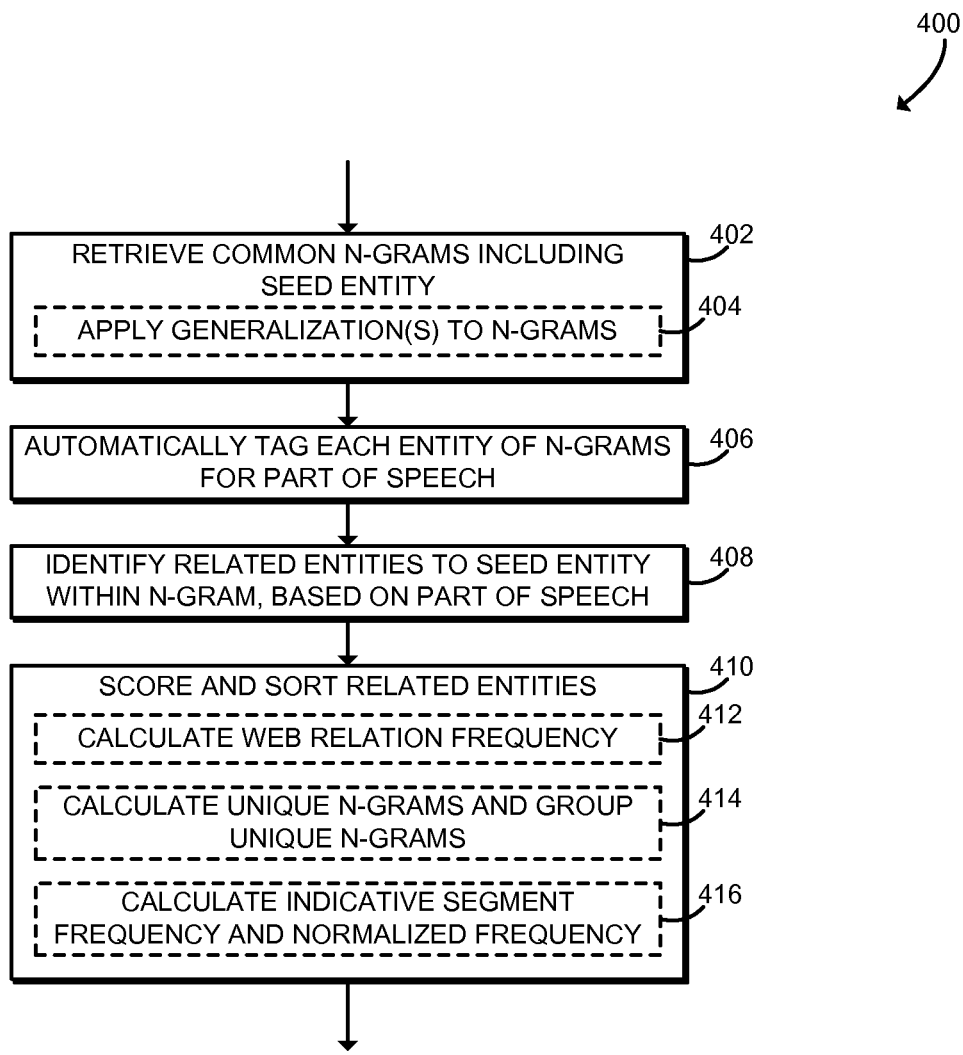
FIG. 4 is a simplified flow diagram of at least one embodiment of a method for generating a semantic graph that may be executed by the computing device of FIGS. 1 and 2.

Referring now to FIG. 4, in use, the computing device 100 may execute a method 400 for generating the semantic graph 210. The method 400 may be executed, for example, as part of the similarity discovery, intent discovery, and/or slot discovery processes described above in connection with the method 300 of FIG. 3. The method 400 begins in block 402, in which the computing device 100 retrieves common n-grams from the web corpus 204 that include the seed entity. As described above, the seed entity may be embodied as a noun or other key term of the relevant domain, and may be supplied by a user. The computing device 100 may use the n-gram index 206 to search the web corpus 204 and return n-grams including the seed entity. The computing device 100 may return only the most common n-grams, for example by sorting the n-grams by frequency and returning a predefined number of n-grams.

In some embodiments, in block 404, the computing device 100 may apply one or more generalizations when retrieving data from the n-gram index 206, in order to group together different n-grams that are essentially similar for the purposes of this disclosure. In particular, the computing device 100 may replace certain entities within the n-grams with generalized placeholders. In some embodiments, the computing device 100 may apply one or more domain-specific generalizations. For example, in the "movie" domain, the ontology of the domain model 216 may include the names of directors. In that example, the names of directors within n-grams may be replaced with a generalized placeholder such as "DIRECTOR." For instance, an n-gram "movie directed by Hitchcock" may be transformed into an n-gram "movie directed by DIRECTOR" and grouped with similar n-grams. Additionally or alternatively, in some embodiments the computing device 100 may apply one or more generic generalizations that do not depend on any particular domain. For example, the computing device 100 may generalize times, dates, locations, or other similar data. For instance, the n-grams "a movie playing in London" and "a movie playing in Paris" may both be transformed to the n-gram "a movie playing in LOCATION."

In block 406, the computing device 100 automatically tags each entity of the retrieved n-grams for parts of speech. That is, the computing device 100 identifies the grammatical part of speech associated with each entity (e.g., word or phrase) of the n-grams. The computing device 100 may use any appropriate technique to automatically tag the n-grams for parts of speech.

In block 408, the computing device 100 identifies related entities within the retrieved n-grams based on the associated part of speech. Each related entity is grammatically related to the seed entity. Related entities may include verbs, adjectives, nouns, subjected prepositions, subordinate clauses, conjunctions, disjunctions, co-occurrences, controlling prepositions, controlling verbs with prepositions, subjected verbs with prepositions, attributives, definitions, or any other grammatical relation. Illustrative related entities along with descriptions and examples are shown in Table 1, below.

TABLE 1

Illustrative related entities.

| Related Entity | Description | Example(s) |
| --- | --- | --- |
| Verb | Verb related to seed entity | "to watch a new movie" |
| Adjective | Adjective describing the seed entity | "trailer for the upcoming movie" |
| Noun modifier | Noun that modifies the seed entity | "an exciting action movie that" |
| Subjected preposition | Prepositional phrase that describes the seed entity or related verb | "seen a movie with effects" "share the movie with friends" |
| Subordinate clause | Subordinate clause that modifies the seed entity | "a movie directed by Kubrick" |
| Modified noun | Noun modified by the seed entity | "movie reviews by genre" |
| Conjunction | Noun related by a conjunction to the seed entity | "for dinner and a movie" |
| Disjunction | Noun related by a disjunction to the seed entity | "a book or a movie" |
| Co-occurrence | Noun that appears in the same n-gram as the seed entity | "a scene from the movie" |
| Controlling preposition | Noun phrase controlling the preposition to which the seed entity is subjected | "a review about the movie" |
| Controlling verb with preposition | Noun phrase controlling the verb with a preposition to which the seed entity is subjected | "audience responded to the movie" |
| Subjected verb with preposition | Noun phrase subjected by the verb with a preposition that the seed entity is controlling | "movie showing in theaters" |

TABLE 1-continued

Illustrative related entities.

| Related Entity | Description | Example(s) |
| --- | --- | --- |
| Attributive | Adjective that follows the seed entity and uses a "be" auxiliary | "the movie is shorter" |
| Definition | Noun phrase that follows the seed entity and uses a "be" auxiliary | "movie is a hit" |

As shown in Table 1, in some embodiments, the computing device 100 may identify a verb related to the seed entity. For example, for the seed entity "movie" and the n-gram "to watch a new movie," the computing device 100 may identify the related verb "watch." In some embodiments, the computing device 100 may identify an adjective describing the seed entity. For example, for the seed entity "movie" and the n-gram "trailer for the upcoming movie," the computing device 100 may identify the related adjective "upcoming." In some embodiments, the computing device 100 may identify a noun that modifies the seed entity. For example, for the seed entity "movie" and the n-gram "an exciting action movie that," the computing device 100 may identify the noun modifier "action." In some embodiments, the computing device 100 may identify a subjected prepositional phrase that describes the seed entity or related verb. For example, for the seed entity "movie" and the n-gram "seen a movie with effects," the computing device 100 may identify the related prepositional phrase "with effects." For the n-gram "share the movie with friends," the computing device 100 may identify the related prepositional phrase "with friends." In some embodiments, the computing device 100 may identify a subordinate clause that modifies the seed entity. For example, for the seed entity "movie" and the n-gram "a movie directed by Kubrick," the computing device 100 may identify the related subordinate clause "directed by Kubrick." In some embodiments, the computing device 100 may identify a noun modified by the seed entity. For example, for the seed entity "movie" and the n-gram "movie reviews by genre," the computing device 100 may identify the modified noun "reviews."

As further shown in Table 1, in some embodiments, the computing device 100 may identify a noun related by a conjunction to the seed entity. For example, for the seed entity "movie" and the n-gram "for dinner and a movie," the computing device 100 may identify the related conjunction noun "dinner." In some embodiments, the computing device 100 may identify a noun related by a disjunction to the seed entity. For example, for the seed entity "movie" and the n-gram "a book or a movie," the computing device 100 may identify the related disjunction noun "book." In some embodiments, the computing device 100 may identify a noun that appears in the same n-gram as the seed entity. For example, for the seed entity "movie" and the n-gram "a scene from the movie," the computing device 100 may identify the co-occurrence noun "scene."

As also shown in Table 1, in some embodiments, the computing device 100 may identify a noun phrase controlling a preposition to which the seed entity is subjected. For example, for the seed entity "movie" and the n-gram "a review about the movie," the computing device 100 may identify the noun "review." In some embodiments, the computing device 100 may identify a noun subjected by a verb with a preposition that the seed entity is controlling. For example, for the seed entity "movie" and the n-gram "movie showing in theaters," the computing device 100 may identify the noun "theaters." In some embodiments, the computing device 100 may identify an adjective that follows the seed entity and uses a "be" auxiliary. For example, for the seed entity "movie" and the n-gram "the movie is shorter," the computing device 100 may identify the adjective "shorter." In some embodiments, the computing device 100 may identify a noun phrase that follows the seed entity and uses a "be" auxiliary. For example, for the seed entity "movie" and the n-gram "movie is a hit," the computing device 100 may identify the noun "hit."

In block 410, the computing device 100 scores and sorts the related entities. In general, the related entities are scored based on their statistical significance or other measure of the strength of their relationships to the seed entity. The computing device 100 may calculate several statistical or other numeric scores, and may sort the related entities on any one or more of those numeric scores. In block 412, in some embodiments, the computing device 100 may calculate a web relation frequency for each of the n-grams extracted including a related entity. For related entity, the web relation frequency may be calculated as the frequency of the n-grams including the corresponding related entity to the overall number of retrieved n-grams. In block 414, in some embodiments the computing device 100 may calculate the number of unique n-grams and group unique n-grams for each related entity. For each related entity, the number of unique n-grams includes the number of unique n-grams including the corresponding related entity. Similarly, the number of group unique n-grams includes the number of unique n-grams including a member of a group of related entities. As described above, the domain model 216 may include a number of similarity groups, with each group including a number of entities that are synonymous within the relevant domain.

In some embodiments, in block 416, the computing device 100 may calculate the indicative segment frequency and the normalized indicative segment frequency for each related entity. A segment is the shortest part of an n-gram including both the seed and the related entity. For example, in the n-gram "we will watch a movie tomorrow," for the seed entity "movie" and related entity "watch," the segment is "watch a movie." The indicative segment is the most frequent segment in the web corpus 204 for the corresponding related entity. When there are several segments with the same frequency for a corresponding related entity, the indicative segment is the shortest of those segments. Thus, the indicative segment may be a most-concise formulation of an n-gram representative of the related entity. Accordingly, the indicative segment frequency may be embodied as the frequency of the indicative segment in the web corpus 204. The normalized indicative segment frequency is normalized to adjust for the frequency of the individual entities of the indicative segment in the web corpus 204. For example, the normalized indicative segment frequency may be embodied as the ratio between the indicative segment frequency and the statistical probability of the appearance of the indicative segment based on the frequency of the elements of the indicative segment in the web corpus 204. After scoring and sorting the related entities, the semantic graph 210 is complete and may be used for similarity discovery, intent discovery, or slot discovery.

Figure 5:
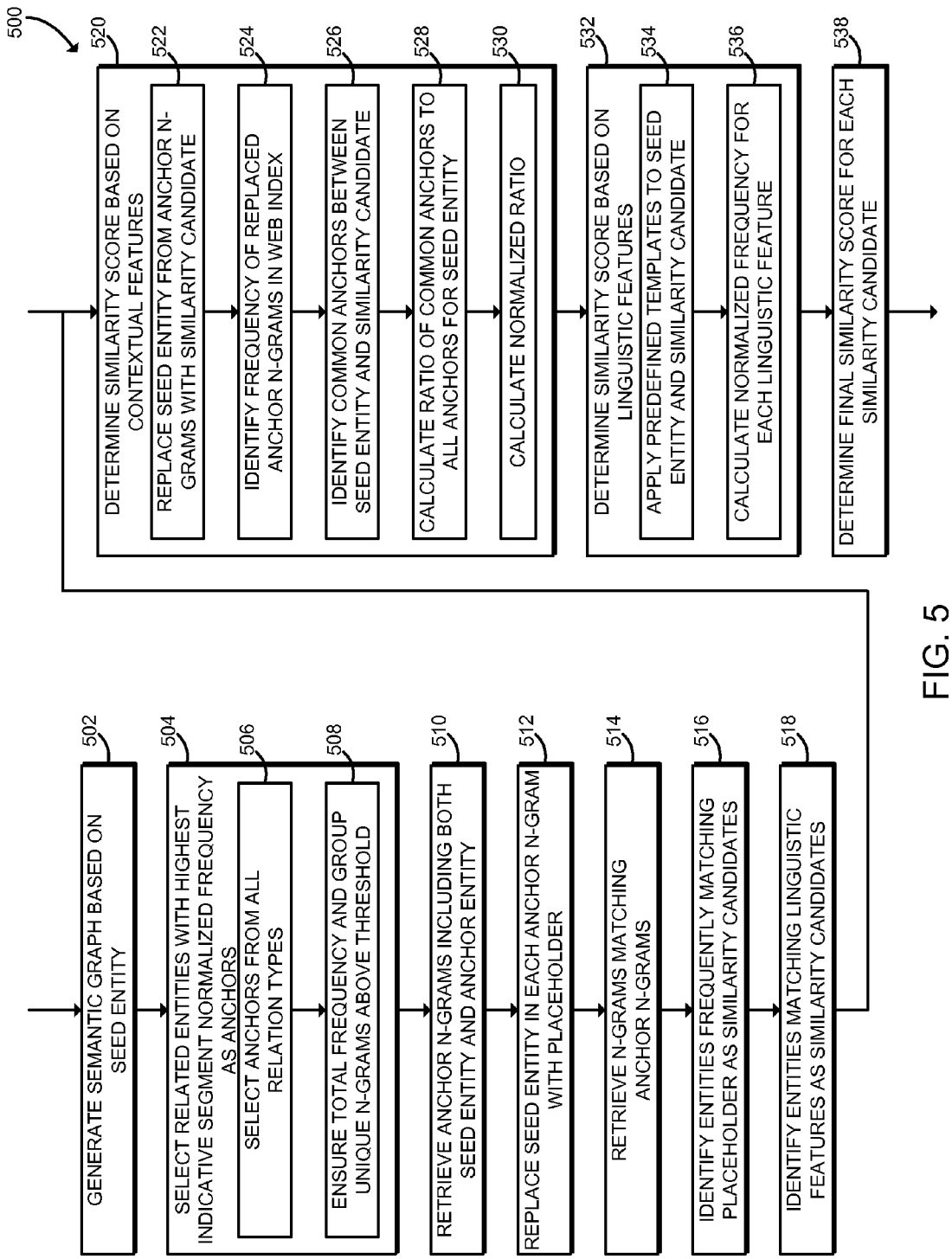
FIG. 5 is a simplified flow diagram of at least one embodiment of a method for similarity discovery and scoring that may be executed by the computing device of FIGS. 1 and 2.

Referring now to FIG. 5, in use, the computing device 100 may execute a method 500 for performing similarity discovery. The method 500 may be executed, for example, as part of the similarity discovery process described above in connection with block 302 of FIG. 3. The method 500 begins in block 502, in which the computing device 100 generates the semantic graph 210 based on the seed entity. The computing device 100 may generate the semantic graph 210 as described above in connection with the method 400 of FIG. 4. As described above, after generation, the semantic graph 210 includes a number of related entities that have been scored based on their relationship to the seed entity.

In block 504, the computing device 100 selects related entities having the highest indicative segment normalized frequency as anchor entities, also known as "anchors." Determination of the indicative segment normalized frequency is described further above in connection with block 416 of FIG. 4. In block 506, the computing device 100 may select anchors from all relation types. For example, the computing device 100 may select anchors from the related verbs, related adjectives, related noun modifiers, and so on. The computing device 100 may adjust the number of anchors selected from each relation type to reflect the relation type frequency in the related entities. In block 508, the computing device 100 may ensure that the total frequency and group unique n-gram number of each selected anchor are above predefined threshold values.

In block 510, the computing device 100 retrieves n-grams from the web corpus 204 including both the seed entity and an anchor entity. Those n-grams may be referred to as "anchor n-grams." The computing device 100 may retrieve only the most frequent anchor n-grams, for example by retrieving a certain number of anchor n-grams or retrieving n-grams having a frequency above a threshold frequency.

In block 512, the computing device 100 replaces the seed entity in each anchor n-gram with a placeholder. For example, the seed entity "movie" may have an anchor "watch." Thus, the anchor n-grams may include the n-gram "I will watch the movie." The computing device 100 may replace the seed entity "movie" with a placeholder (i.e., "*"), generating a placeholder-replacement anchor n-gram "I will watch the *." In block 514, the computing device 100 retrieves n-grams from the web corpus 204 matching the placeholder-replacement anchor n-grams. The computing device 100 may retrieve matching n-grams including any entity in the position of the placeholder having the same part of speech as the original seed entity. Continuing the previous example, for the placeholder-replacement anchor n-gram "I will watch the *," the computing device 100 may retrieve n-grams such as "I will watch the film" and/or "I will watch the show." In block 516, the computing device 100 identifies entities frequently matching the placeholder position as similarity candidates. The computing device 100 may identify a certain number of most-frequent matching entities, matching entities having a frequency above a threshold, or any other appropriate frequency criteria.

In block 518, the computing device 100 identifies entities matching linguistic features as similarity candidates. As further described below, the linguistic features may be matched by applying one or more predefined templates to the seed entity. The templates may be designed to find entities appearing with the seed entity in the web corpus 204 in close context. For example, the templates may be predefined to generate n-grams likely to be linguistically correct for similar entities. As an example, a template may be embodied simply as "<seed entity> or *." Continuing that example, the linguistic feature may match the n-gram "movie or film," and the entity "film" may be identified as a similarity candidate.

After identifying the similarity candidates, the method 500 proceeds to block 520. Additionally or alternatively, in some embodiments the similarity candidates may be specified by a user or by another process of the computing device 100. In those embodiments, the method 500 may begin processing the similarity candidates in block 520, as illustrated in FIG. 5.

In block 520, the computing device 100 determines a similarity score for each of the similarity candidates relative to the seed entity based on contextual features. In block 522, the computing device 100 replaces the seed entity in each of the anchor n-grams with the corresponding similarity candidate. For example, the seed entity "movie" may have a similarity candidate "film." In that example, an anchor n-gram "I will watch the movie" may be replaced with the candidate-replacement anchor n-gram "I will watch the film." In block 524, the computing device 100 identifies the frequency of each candidate-replacement anchor n-gram in the web corpus 204. In block 526, the computing device 100 identifies common anchors between the seed entity and the similarity candidate, using the frequency of the candidate-replacement anchor n-grams. A common anchor may be included in n-grams including both the seed entity and the similarity candidate. For example, if both of the n-grams "I will watch the movie" and "I will watch the film" occur in the web corpus 204 with some frequency, then the anchor "watch" may be a common anchor for both the seed entity "movie" and the similarity candidate "film." In block 528, the computing device 100 calculates a ratio of the number of common anchors between the similarity candidate and the seed entity by the total number of anchors of the seed entity. In block 530, the computing device 100 normalizes the ratio based on the frequency of the similarity candidate in the web corpus 204 relative to the frequency of the seed entity in the web corpus 204.

In block 532, the computing device 100 determines a similarity score for each of the similarity candidates relative to the seed entity based on linguistic features. In block 534, the computing device 100 applies one or more predefined templates to the seed entity and the similarity candidate to generate a linguistic feature. The templates may be designed to test the probability that the seed entity and the similarity candidate appear in the web corpus 204 in close context. For example, the templates may be predefined to generate n-grams likely to be linguistically correct for similar entities. For example, a template may be embodied simply as "<seed entity> or <similarity candidate>." Continuing the previous example, that template may create the linguistic feature "movie or film." In block 536, the computing device 100 calculates the normalized frequency of occurrence in the web corpus 204 for each generated linguistic feature.

In block 538, the computing device 100 determines the final similarity score for each similarity candidate based on the contextual similarity score and the linguistic similarity score. After generating the final similarity score, the method 500 is completed. The similarity scores may be used as feedback in later iterations to further expand the domain model 216. For example, the similar entities may be used as seed entities for further expansion of the semantic graph 210 or may be added to the ontology or similarity groups of the domain model 216. Additional processes of the computing device 100, such as intent discovery and slot discovery, may also use the similarity scores.

Figure 6:
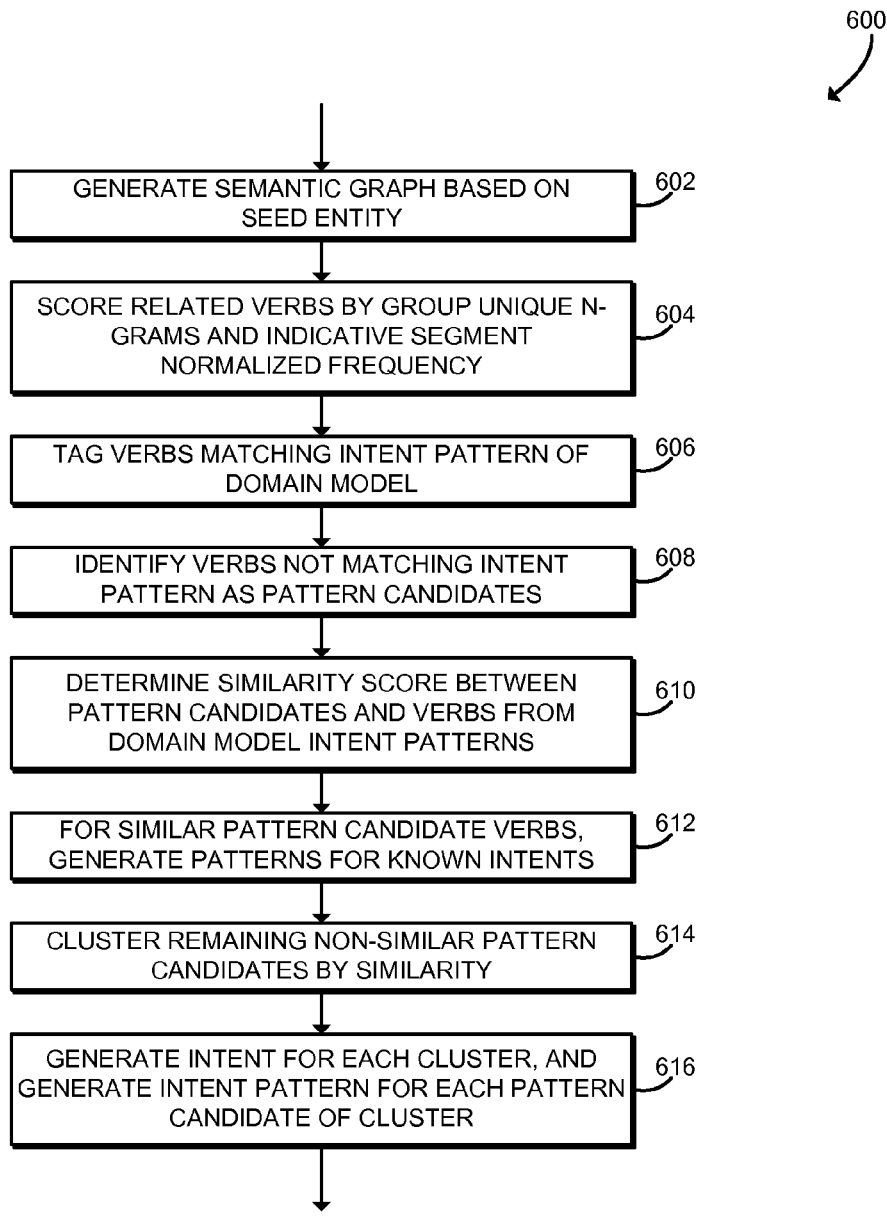
FIG. 6 is a simplified flow diagram of at least one embodiment of a method for intent discovery that may be executed by the computing device of FIGS. 1 and 2.

Referring now to FIG. 6, in use, the computing device 100 may execute a method 600 for performing intent discovery. The method 600 may be executed, for example, as part of the intent discovery process described above in connection with block 304 of FIG. 3. The method 600 begins in block 602, in which the computing device 100 generates the semantic graph 210 based on the seed entity. The computing device 100 may generate the semantic graph 210 as described above in connection with the method 400 of FIG. 4. As described above, after generation, the semantic graph 210 includes a number of related entities that have been scored based on their relationship to the seed entity.

In block 604, the computing device 100 scores verbs of the related entities by group unique n-grams and indicative segment normalized frequency. The computing device 100 may select top-scored verbs for further processing, for example by selecting a number of top-scoring verbs or by selecting verbs having a score above a threshold score.

In block 606, the computing device 100 tags all verbs matching an existing intent pattern of the domain model 216. For example, a semantic graph 210 for the seed entity "movie" may include a related verb "watch." The domain model 216 may include a linguistic intent pattern "watch+movie" for the "watch a movie" intent. In that example, the verb "watch" related to the seed term "movie" is tagged as matching the intent pattern "watch+movie." Tagged verbs may be used as real-world natural language usage examples for a known intent.

In block 608, the computing device 100 identifies verbs not matching an existing intent pattern of the domain model 216 as pattern candidates. In block 610, the computing device 100 determines similarity scores between the pattern candidates and the verbs of the existing intent patterns of the domain model 216. Continuing the previous example, the semantic graph 210 may include the verb "see" related to the seed entity "movie." The verb "see" may not match any intent patterns in the domain model 216; for example, the verb "see" does not match the intent pattern "watch+movie." In that example, the computing device 100 may determine the similarity score between the verbs "see" and "watch." The computing device 100 may determine the similarity scores by performing the method 500 starting with block 520 on the pattern candidates and the existing verbs, as described above in connection with FIG. 5.

In block 612, the computing device 100 generates intent patterns for pattern candidates that are similar to verbs of existing intent pattern candidates in the domain model 216. The generated intent patterns are associated with the intent of the corresponding existing intent pattern candidate. The computing device 100 may determine whether a pattern candidate and existing verb are similar using any technique, such as identifying a number of pattern candidates with the highest similarity scores or by identifying all pattern candidates having similarity scores above a threshold score. For example, continuing the previous example, the computing device 100 may determine that the pattern candidate "see" is similar to the existing verb "watch" of the domain model 216. In that example, the computing device 100 may generate an additional intent pattern candidate "see+movie" associated with the "watch a movie" intent of the domain model 216.

In block 614, the computing device 100 clusters the remaining, non-similar pattern candidates by similarity. Clustering the pattern candidates identifies groups of similar pattern candidates. The computing device 100 may use any algorithm, process, or other technique to cluster the pattern candidates, such as an unsupervised clustering algorithm. The pattern candidates may be evaluated for similarity by performing the method 500 starting with block 520 on pairs of the pattern candidates, as described above in connection with FIG. 5. In block 616, the computing device 100 generates an intent for each cluster of pattern candidates. The computing device 100 also generates an intent pattern for each pattern candidate and associates the new intent pattern with the intent of the corresponding cluster of pattern candidates. Continuing the previous example, the pattern candidates "get," "download," and "buy," which may not be considered similar to the known verb "watch," may be grouped into a cluster for a new "download a movie" intent. Additionally, the intent patterns "get+movie," "download+movie," and "buy+movie" may be generated for that intent. After generating the intents and intent patterns, the method 600 is complete. As described above in connection with FIG. 3, the new intents and intent patterns may be added to the domain model 216, and additional intent discovery may be performed in future iterations.

Figure 7:
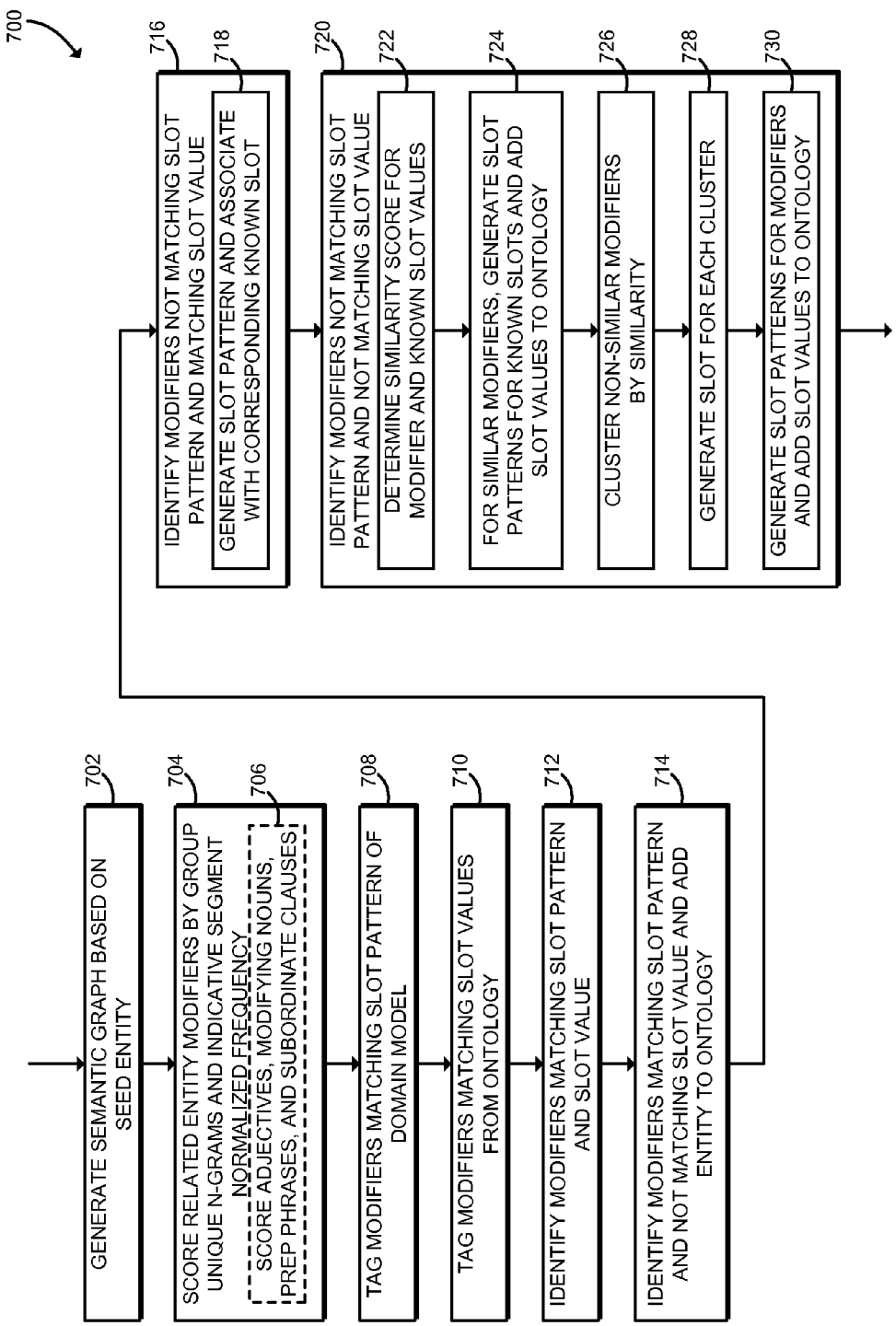
FIG. 7 is a simplified flow diagram of at least one embodiment of a method for slot discovery that may be executed by the computing device of FIGS. 1 and 2.

Referring now to FIG. 7, in use, the computing device 100 may execute a method 700 for performing slot discovery. The method 700 may be executed, for example, as part of the slot discovery process described above in connection with block 306 of FIG. 3. The method 700 begins in block 702, in which the computing device 100 generates the semantic graph 210 based on the seed entity. The computing device 100 may generate the semantic graph 210 as described above in connection with the method 400 of FIG. 4. As described above, after generation, the semantic graph 210 includes a number of related entities that have been scored based on their relationship to the seed entity.

In block 704, the computing device 100 scores modifiers of the related entities by group unique n-grams and indicative segment normalized frequency. Modifiers may include any related entities of the semantic graph 210 that modify the seed entity or other related entities. For example, in some embodiments, in block 706 the computing device 100 scores related adjectives, modifying nouns, prepositional phrases, and subordinate clauses of the semantic graph 210. The computing device 100 may select top-scoring modifiers for further processing, for example by selecting a number of top-scoring modifiers or by selecting modifiers having a score above a threshold score.

In block 708, the computing device 100 tags all modifiers matching an existing slot pattern of the domain model 216. In block 710, the computing device 100 tags all modifiers matching an existing slot value included in the ontology of the domain model 216. For example, a semantic graph 210 for the seed entity "movie" may include a related subordinate clause "directed by Hitchcock." In that example, the entity "Hitchcock" may be tagged as matching a slot value for the existing slot "DIRECTOR" in the domain model 216. In block 712, the computing device 100 identifies modifiers that match both an existing slot pattern and an existing slot value. Tagged modifiers may be used as real-world natural language usage examples for a known slot.

In block 714, the computing device 100 identifiers modifiers matching a slot pattern but not matching an existing slot value of the domain model 216. The computing device 100 adds the entity of the modifier corresponding to the slot tag of the matching slot pattern to the ontology of the domain model 216. For example, the domain model 216 may include a slot pattern "movie directed by DIRECTOR," where "DIRECTOR" is a slot tag that may be replaced by slot values for the "director" slot. Continuing that example, a modifier "directed by Kubrick" matches that slot pattern. In that example, the computing device 100 may determine that the entity "Kubrick" is not included in the ontology of the domain model 216, and as a result the computing device 100 may add the entity "Kubrick" to the domain model 216.

In block 716, the computing device 100 identifies modifiers that do not match an existing slot pattern but include a matching slot value from the domain model 216. In block 718, the computing device 100 generates slot patterns based on those modifiers and associates the slot patterns with the slot of the corresponding matching slot value. The computing device 100 may generate slot patterns only for recurring matching modifiers. For example, the domain model 216 may include the known slot values "Hitchcock" and "Welles" for the slot "DIRECTOR." In that example, the related entity or associated n-gram "movie directed by Hitchcock" may be tagged as "movie directed by DIRECTOR," and the entity or associated n-gram "movie directed by Welles" may also be tagged as "movie directed by DIRECTOR." Continuing that example, the computing device 100 may generate a new n-gram slot pattern "movie directed by DIRECTOR" associated with the "DIRECTOR" slot.

In block 720, the computing device 100 identifies modifiers that do not match an existing slot pattern and do not include an existing slot value of the domain model 216. Those modifiers may be referred to as pattern candidates. In block 722, the computing device 100 determines similarity scores between the pattern candidates and the existing slot values of the domain model 216. Continuing the previous example, the domain model 216 may include the slot values "Hitchcock" and "Welles" for the slot "DIRECTOR." The semantic graph 210 may include the related modifier or associated n-gram "movie directed by Chaplin." In that example, the related entity "Chaplin" may be tested for similarity with the slot values "Hitchcock" and "Welles." The computing device 100 may determine the similarity scores by performing the method 500 starting with block 520 on the pattern candidates and the existing slot values, as described above in connection with FIG. 5.

In block 724, the computing device 100 generates slot patterns and slot values for pattern candidates that are similar to slot values in the domain model 216. The generated slot patterns are associated with the slot of the corresponding existing slot values. The computing device 100 may determine whether a pattern candidate and existing slot value are similar using any suitable technique, such as identifying a number of pattern candidates with the highest similarity scores or by identifying all pattern candidates having similarity scores above a threshold score. For example, continuing the previous example, the computing device 100 may determine that the pattern candidate "Chaplin" is similar to the existing slot values "Hitchcock" and "Welles" of the domain model 216. In that example, the computing device 100 may generate an additional slot value "Chaplin" associated with the "DIRECTOR" slot of the domain model 216. Based on the related entity "movie directed by Chaplin," the computing device 100 may also generate an additional slot pattern candidate "movie directed by DIRECTOR" associated with the "DIRECTOR" slot of the domain model 216.

In block 726, the computing device 100 clusters the remaining, non-similar pattern candidates by similarity. Clustering the pattern candidates identifies groups of similar pattern candidates. The computing device 100 may use any algorithm, process, or other technique to cluster the pattern candidates, such as an unsupervised clustering algorithm. The pattern candidates may be evaluated for similarity by performing the method 500 starting with block 520 on pairs of the pattern candidates, as described above in connection with FIG. 5. In block 728, the computing device 100 generates a slot for each cluster of pattern candidates. In block 730, the computing device 100 generates a slot pattern and associated slot values for each pattern candidate. The slot patterns and slot values are associated with the slot of the corresponding cluster of pattern candidates. Continuing the previous example, the remaining pattern candidates may include a cluster of pattern candidates including "movie premiers in January," "movie premiers in March," and "movie premiers in 2015." Based on the clusters and the pattern candidates, the computing device 100 may generate a slot "TIME," a slot pattern "movie premiers in TIME," and the slot values "January," "March," and "2015." After generating the slots, slot patterns, and slot values, the method 700 is complete. As described above in connection with FIG. 3, the new slots, slot patterns, and slot values may be added to the domain model 216, and additional slot discovery may be performed in future iterations.

EXAMPLES

Illustrative examples of the devices, systems, and methods disclosed herein are provided below. An embodiment of the devices, systems, and methods may include any one or more, and any combination of, the examples described below.

Example 1 includes a computing device for domain model creation, the computing device comprising a web corpus module to access an n-gram index of a web corpus, wherein the n-gram index is indicative of a plurality of entities of each n-gram and a frequency of each n-gram; a semantic graph module to generate a semantic graph of the web corpus using the n-gram index of the web corpus, wherein the semantic graph is rooted by a predefined seed entity and includes a first plurality of related entities, wherein each of the first plurality of related entities is related to the seed entity; a similarity discovery module to analyze the web corpus using the semantic graph to identify and rank contextual synonyms for entities within a domain; an intent discovery module to analyze the web corpus using the semantic graph to identify intents and intent patterns in the domain, wherein each intent is associated with a domain action, and each intent pattern matches query features and a corresponding intent; and a slot discovery module to analyze the web corpus using the semantic graph to identify slots, slot patterns, and slot values in the domain, wherein each slot is associated with a parameter of an intent or an entity, each slot pattern matches query features and a corresponding slot, and each slot value is associated with an entity.

Example 2 includes the subject matter of Example 1, and wherein to generate the semantic graph comprises to retrieve a first plurality of n-grams from the web corpus using the n-gram index, wherein each of the first plurality of n-grams includes the seed entity; tag each entity of the first plurality of n-grams for part-of-speech; identify the first plurality of related entities in response to tagging of each entity; and score each of the first plurality of related entities.

Example 3 includes the subject matter of any of Examples 1 and 2, and wherein to identify the first plurality of related entities comprises to identify a verb related to the seed entity, an adjective related to the seed entity, a noun modifier related to the seed entity, a prepositional phrase related to the seed entity, a subordinate clause related to the seed entity, a modified noun related to the seed entity, a conjunction relating a noun to the seed entity, a disjunction relating a noun to the seed entity, a noun that co-occurs with the seed entity, a noun controlling a proposition to which the seed entity is subjected, a noun controlling a verb with a preposition to which the seed entity is subjected, a noun subjected by a verb with a preposition that the seed entity is controlling, an adjective that follows the seed entity and uses a "be" auxiliary, or a noun that follows the seed entity and uses a "be" auxiliary.

Example 4 includes the subject matter of any of Examples 1-3, and wherein to score each of the first plurality of related entities comprises to determine a first number of n-grams in the first plurality of n-grams; determine a second number of n-grams in the first plurality of n-grams that each include a related entity of the first plurality of related entities; and determine a web relation frequency as a function of a frequency of the second number of n-grams in the first number of n-grams.

Example 5 includes the subject matter of any of Examples 1-4, and wherein to score each of the first plurality of related entities comprises to determine a first number of unique n-grams in the first plurality of n-grams; and determine, for each group of related entities in the first plurality of related entities, a second number of unique n-grams in the first plurality of n-grams that each include an entity of the corresponding group of related entities.

Example 6 includes the subject matter of any of Examples 1-5, and wherein to score each of the first plurality of related entities comprises to calculate an indicative segment frequency in the web corpus and a normalized indicative segment frequency in the web corpus for the corresponding related entity.

Example 7 includes the subject matter of any of Examples 1-6, and wherein to calculate the indicative segment frequency and the normalized indicative segment frequency comprises to identify a plurality of segments including the corresponding related entity, wherein each segment comprises a shortest part of an n-gram of the first plurality of n-grams that includes the seed entity and the corresponding related entity; and identify a most common segment of the plurality of segments as the indicative segment of the corresponding related entity.

Example 8 includes the subject matter of any of Examples 1-7, and wherein to calculate the normalized indicative segment frequency comprises to determine a probable frequency of occurrence in the web corpus of the entities of the indicative segment of the corresponding related entity; and divide the indicative segment frequency of the corresponding related entity by the probable frequency of occurrence.

Example 9 includes the subject matter of any of Examples 1-8, and wherein to analyze the web corpus using the semantic graph to identify and rank contextual synonyms for entities within the domain comprises to select related entities of the first plurality of related entities having a highest indicative segment normalized frequency as anchor entities; retrieve anchor n-grams from the web corpus, wherein each anchor n-gram includes the seed entity and an anchor entity; replace the seed entity of each anchor n-gram with a placeholder; retrieve candidate n-grams from the web corpus, wherein each candidate n-gram matches an anchor n-gram; identify entities of the candidate n-grams matching the placeholder of the corresponding anchor n-gram as similarity candidates; and score each of the similarity candidates based on similarity to the seed entity.

Example 10 includes the subject matter of any of Examples 1-9, and wherein to score each of the similarity candidates comprises to generate a contextual similarity score for the corresponding similarity candidate based on contextual features; generate a linguistic similarity score for the corresponding similarity candidate based on linguistic features; and determine a similarity score for the corresponding similarity candidate as a function of the corresponding contextual similarity score and the corresponding linguistic similarity score.

Example 11 includes the subject matter of any of Examples 1-10, and wherein to generate the contextual similarity score for the corresponding similarity candidate comprises to replace the seed entity of each anchor n-gram with the corresponding similarity candidate to generate replaced anchor n-grams; search the web corpus for the replaced anchor n-grams using the n-gram index; identify common anchors of the seed entity and the corresponding similarity candidate, wherein the common anchors are included in replaced anchor n-grams found in the web corpus; calculate a first ratio of a number of common anchors to a number of anchors of the seed entity; and calculate a normalized ratio as a function of the first ratio, a frequency of the corresponding similarity candidate in the web corpus, and a frequency of the seed entity in the web corpus.

Example 12 includes the subject matter of any of Examples 1-11, and wherein to generate the linguistic similarity score for the corresponding similarity candidate comprises to apply a plurality of predefined templates using the seed entity and the corresponding similarity candidate to generate linguistic features; and calculate a normalized frequency for each linguistic feature in the corpus.

Example 13 includes the subject matter of any of Examples 1-12, and further including a domain model module to add the intents, intent patterns, slots, slot patterns, and slot values to a domain model, wherein the domain model includes known intents, intent patters, slots, and slot patterns associated with the domain and an ontology including known slot values associated with the domain.

Example 14 includes the subject matter of any of Examples 1-13, and wherein to analyze the web corpus using the semantic graph to identify the intent patterns in the domain comprises to score a first plurality of verbs of the first plurality of related entities of the semantic graph by a number of group unique n-grams and an indicative segment normalized frequency of the corresponding verb; identify one or more unknown verbs of the first plurality of verbs, wherein each of the unknown verbs does not match an intent pattern of the domain model; determine a similarity score for each pair of an unknown verb and a verb of the intent patterns of the domain model; identify one or more similar verbs of the unknown verbs as a function of the corresponding similarity score for the unknown verb and the verb of the intent patterns of the domain model; and generate, for each similar verb of the one or more similar verbs, a new intent pattern for the intent of the corresponding intent pattern of the domain model.

Example 15 includes the subject matter of any of Examples 1-14, and wherein to analyze the web corpus using the semantic graph to identify the intents and the intent patterns in the domain comprises to cluster one or more remaining verbs of the unknown verbs to generate clusters of remaining verbs, wherein each of the remaining verbs is not a similar verb; generate, for each cluster of remaining verbs, an intent; and generate, for each remaining verb of the clusters of remaining verbs, an intent pattern associated with the intent for the corresponding cluster of remaining verbs.

Example 16 includes the subject matter of any of Examples 1-15, and wherein to analyze the web corpus using the semantic graph to identify the slot values in the domain comprises to score a first plurality of modifiers of the first plurality of related entities of the semantic graph by a number of group unique n-grams and an indicative segment normalized frequency; identify one or more known modifiers of the first plurality of modifiers, wherein each of the known modifiers matches a slot pattern of the domain model; identify one or more unknown slot values of the known modifiers, wherein each of the unknown slot values does not match a slot value of the ontology of the domain model; and add the one or more unknown slot values to the ontology of the domain model.

Example 17 includes the subject matter of any of Examples 1-16, and wherein the first plurality of modifiers comprises an adjective, a modifying noun, a prepositional phrase, or a subordinate clause.

Example 18 includes the subject matter of any of Examples 1-17, and wherein to analyze the web corpus using the semantic graph to identify the slot patterns in the domain comprises to identify one or more unknown modifiers of the first plurality of modifiers, wherein each of the unknown modifiers does not match a slot pattern of the domain model; identify one or more first unknown modifiers of the unknown modifiers, wherein each of the first unknown modifiers includes a slot value matching a slot value of the ontology of the domain model; and generate, for each of the first unknown modifiers, a new slot pattern for the slot of the corresponding slot value.

Example 19 includes the subject matter of any of Examples 1-18, and wherein to analyze the web corpus using the semantic graph to identify the slot patterns and the slot values in the domain comprises to identify one or more second unknown modifiers of the unknown modifiers, wherein each of the second unknown modifiers is not a first unknown modifier; determine a similarity score for each pair of a second unknown modifier and a slot value of the ontology; identify one or more similar modifiers of the second unknown modifiers as a function of the corresponding similarity score for the second unknown modifier and the slot value of the ontology; generate, for each similar modifier, a new slot pattern for the slot of the corresponding slot value of the ontology; and add, for each similar modifier, a new slot value of the corresponding similar modifier to the ontology.

Example 20 includes the subject matter of any of Examples 1-19, and wherein to analyze the web corpus using the semantic graph to identify the slots, the slot patterns, and the slot values in the domain comprises to cluster one or more remaining modifiers of the second unknown modifiers to generate clusters of remaining modifiers, wherein each of the remaining modifiers is not a similar modifier; generate, for each cluster of remaining modifiers, a slot; generate, for each remaining modifier of the clusters of remaining modifiers, a slot pattern associated with the slot for the corresponding cluster of remaining modifiers; and add, for each remaining modifier of the cluster of remaining modifiers, a slot value of the corresponding remaining modifier to the ontology.

Example 21 includes a method for domain model creation, the method comprising generating, by a computing device, a semantic graph of a web corpus using an n-gram index of the web corpus, wherein the n-gram index is indicative of a plurality of entities of each n-gram and a frequency of each n-gram, and wherein the semantic graph is rooted by a predefined seed entity and includes a first plurality of related entities, wherein each of the first plurality of related entities is related to the seed entity; analyzing, by the computing device, the web corpus using the semantic graph to identify and rank contextual synonyms for entities within a domain; analyzing, by the computing device, the web corpus using the semantic graph to identify intents and intent patterns in the domain, wherein each intent is associated with a domain action, and each intent pattern matches query features and a corresponding intent; and analyzing, by the computing device, the web corpus using the semantic graph to identify slots, slot patterns, and slot values in the domain, wherein each slot is associated with a parameter of an intent or an entity, each slot pattern matches query features and a corresponding slot, and each slot value is associated with an entity.

Example 22 includes the subject matter of Example 21, and wherein generating the semantic graph comprises retrieving a first plurality of n-grams from the web corpus using the n-gram index, wherein each of the first plurality of n-grams includes the seed entity; tagging each entity of the first plurality of n-grams for part-of-speech; identifying the first plurality of related entities in response to tagging each entity; and scoring each of the first plurality of related entities.

Example 23 includes the subject matter of any of Examples 21 and 22, and wherein identifying the first plurality of related entities comprises identifying a verb related to the seed entity; identifying an adjective related to the seed entity; identifying a noun modifier related to the seed entity; identifying a prepositional phrase related to the seed entity; identifying a subordinate clause related to the seed entity; identifying a modified noun related to the seed entity; identifying a conjunction relating a noun to the seed entity; identifying a disjunction relating a noun to the seed entity; identifying a noun co-occurring with the seed entity; identifying a noun controlling a proposition to which the seed entity is subjected; identifying a noun controlling a verb with a preposition to which the seed entity is subjected; identifying a noun subjected by a verb with a preposition that the seed entity is controlling; identifying an adjective that follows the seed entity and uses a "be" auxiliary; or identifying a noun that follows the seed entity and uses a "be" auxiliary.

Example 24 includes the subject matter of any of Examples 21-23, and wherein scoring each of the first plurality of related entities comprises determining a first number of n-grams in the first plurality of n-grams; determining a second number of n-grams in the first plurality of n-grams including a related entity of the first plurality of related entities; and determining a web relation frequency as a function of a frequency of the second number of n-grams in the first number of n-grams.

Example 25 includes the subject matter of any of Examples 21-24, and wherein scoring each of the first plurality of related entities comprises determining a first number of unique n-grams in the first plurality of n-grams; and determining, for each group of related entities in the first plurality of related entities, a second number of unique n-grams in the first plurality of n-grams including an entity of the corresponding group of related entities.

Example 26 includes the subject matter of any of Examples 21-25, and wherein scoring each of the first plurality of related entities comprises calculating an indicative segment frequency in the web corpus and a normalized indicative segment frequency in the web corpus for the corresponding related entity.

Example 27 includes the subject matter of any of Examples 21-26, and wherein calculating the indicative segment frequency and the normalized indicative segment frequency comprises identifying a plurality of segments including the corresponding related entity, wherein each segment comprises a shortest part of an n-gram of the first plurality of n-grams including the seed entity and the corresponding related entity; and identifying a most common segment of the plurality of segments as the indicative segment of the corresponding related entity.

Example 28 includes the subject matter of any of Examples 21-27, and wherein calculating the normalized indicative segment frequency comprises determining a probable frequency of occurrence in the web corpus of the entities of the indicative segment of the corresponding related entity; and dividing the indicative segment frequency of the corresponding related entity by the probable frequency of occurrence.

Example 29 includes the subject matter of any of Examples 21-28, and wherein analyzing the web corpus using the semantic graph to identify and rank contextual synonyms for entities within the domain comprises selecting related entities of the first plurality of related entities having a highest indicative segment normalized frequency as anchor entities; retrieving anchor n-grams from the web corpus, wherein each anchor n-gram includes the seed entity and an anchor entity; replacing the seed entity of each anchor n-gram with a placeholder; retrieving candidate n-grams from the web corpus, wherein each candidate n-gram matches an anchor n-gram; identifying entities of the candidate n-grams matching the placeholder of the corresponding anchor n-gram as similarity candidates; and scoring each of the similarity candidates based on similarity to the seed entity.

Example 30 includes the subject matter of any of Examples 21-29, and wherein scoring each of the similarity candidates comprises generating a contextual similarity score for the corresponding similarity candidate based on contextual features; generating a linguistic similarity score for the corresponding similarity candidate based on linguistic features; and determining a similarity score for the corresponding similarity candidate as a function of the corresponding contextual similarity score and the corresponding linguistic similarity score.

Example 31 includes the subject matter of any of Examples 21-30, and wherein generating the contextual similarity score for the corresponding similarity candidate comprises replacing the seed entity of each anchor n-gram with the corresponding similarity candidate to generate replaced anchor n-grams; searching the web corpus for the replaced anchor n-grams using the n-gram index; identifying common anchors of the seed entity and the corresponding similarity candidate, wherein the common anchors are included in replaced anchor n-grams found in the web corpus; calculating a first ratio of a number of common anchors to a number of anchors of the seed entity; and calculating a normalized ratio as a function of the first ratio, a frequency of the corresponding similarity candidate in the web corpus, and a frequency of the seed entity in the web corpus.

Example 32 includes the subject matter of any of Examples 21-31, and wherein generating the linguistic similarity score for the corresponding similarity candidate comprises applying a plurality of predefined templates using the seed entity and the corresponding similarity candidate to generate linguistic features; and calculating a normalized frequency for each linguistic feature in the corpus.

Example 33 includes the subject matter of any of Examples 21-32, and further including adding, by the computing device, the intents, intent patterns, slots, slot patterns, and slot values to a domain model, wherein the domain model includes known intents, intent patters, slots, and slot patterns associated with the domain and an ontology including known slot values associated with the domain.

Example 34 includes the subject matter of any of Examples 21-33, and wherein analyzing the web corpus using the semantic graph to identify the intent patterns in the domain comprises scoring a first plurality of verbs of the first plurality of related entities of the semantic graph by a number of group unique n-grams and an indicative segment normalized frequency of the corresponding verb; identifying one or more unknown verbs of the first plurality of verbs, wherein each of the unknown verbs does not match an intent pattern of the domain model; determining a similarity score for each pair of an unknown verb and a verb of the intent patterns of the domain model; identifying one or more similar verbs of the unknown verbs as a function of the corresponding similarity score for the unknown verb and the verb of the intent patterns of the domain model; and generating, for each similar verb of the one or more similar verbs, a new intent pattern for the intent of the corresponding intent pattern of the domain model.

Example 35 includes the subject matter of any of Examples 21-34, and wherein analyzing the web corpus using the semantic graph to identify the intents and the intent patterns in the domain comprises clustering one or more remaining verbs of the unknown verbs to generate clusters of remaining verbs, wherein each of the remaining verbs is not a similar verb; generating, for each cluster of remaining verbs, an intent; and generating, for each remaining verb of the clusters of remaining verbs, an intent pattern associated with the intent for the corresponding cluster of remaining verbs.

Example 36 includes the subject matter of any of Examples 21-35, and wherein analyzing the web corpus using the semantic graph to identify the slot values in the domain comprises scoring a first plurality of modifiers of the first plurality of related entities of the semantic graph by a number of group unique n-grams and an indicative segment normalized frequency; identifying one or more known modifiers of the first plurality of modifiers, wherein each of the known modifiers matches a slot pattern of the domain model; identifying one or more unknown slot values of the known modifiers, wherein each of the unknown slot values does not match a slot value of the ontology of the domain model; and adding the one or more unknown slot values to the ontology of the domain model.

Example 37 includes the subject matter of any of Examples 21-36, and wherein the first plurality of modifiers comprises an adjective, a modifying noun, a prepositional phrase, or a subordinate clause.

Example 38 includes the subject matter of any of Examples 21-37, and wherein analyzing the web corpus using the semantic graph to identify the slot patterns in the domain comprises identifying one or more unknown modifiers of the first plurality of modifiers, wherein each of the unknown modifiers does not match a slot pattern of the domain model; identifying one or more first unknown modifiers of the unknown modifiers, wherein each of the first unknown modifiers includes a slot value matching a slot value of the ontology of the domain model; and generating, for each of the first unknown modifiers, a new slot pattern for the slot of the corresponding slot value.

Example 39 includes the subject matter of any of Examples 21-38, and wherein analyzing the web corpus using the semantic graph to identify the slot patterns and the slot values in the domain comprises identifying one or more second unknown modifiers of the unknown modifiers, wherein each of the second unknown modifiers is not a first unknown modifier; determining a similarity score for each pair of a second unknown modifier and a slot value of the ontology; identifying one or more similar modifiers of the second unknown modifiers as a function of the corresponding similarity score for the second unknown modifier and the slot value of the ontology; generating, for each similar modifier, a new slot pattern for the slot of the corresponding slot value of the ontology; and adding, for each similar modifier, a new slot value of the corresponding similar modifier to the ontology.

Example 40 includes the subject matter of any of Examples 21-39, and wherein analyzing the web corpus using the semantic graph to identify the slots, the slot patterns, and the slot values in the domain comprises clustering one or more remaining modifiers of the second unknown modifiers to generate clusters of remaining modifiers, wherein each of the remaining modifiers is not a similar modifier; generating, for each cluster of remaining modifiers, a slot; generating, for each remaining modifier of the clusters of remaining modifiers, a slot pattern associated with the slot for the corresponding cluster of remaining modifiers; and adding, for each remaining modifier of the cluster of remaining modifiers, a slot value of the corresponding remaining modifier to the ontology.

Example 41 includes a computing device comprising a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for domain model creation, the computing device comprising means for generating a semantic graph of a web corpus using an n-gram index of the web corpus, wherein the n-gram index is indicative of a plurality of entities of each n-gram and a frequency of each n-gram, and wherein the semantic graph is rooted by a predefined seed entity and includes a first plurality of related entities, wherein each of the first plurality of related entities is related to the seed entity; means for analyzing the web corpus using the semantic graph to identify and rank contextual synonyms for entities within a domain; means for analyzing the web corpus using the semantic graph to identify intents and intent patterns in the domain, wherein each intent is associated with a domain action, and each intent pattern matches query features and a corresponding intent; and means for analyzing the web corpus using the semantic graph to identify slots, slot patterns, and slot values in the domain, wherein each slot is associated with a parameter of an intent or an entity, each slot pattern matches query features and a corresponding slot, and each slot value is associated with an entity.

Example 45 includes the subject matter of Example 44, and wherein the means for generating the semantic graph comprises means for retrieving a first plurality of n-grams from the web corpus using the n-gram index, wherein each of the first plurality of n-grams includes the seed entity; means for tagging each entity of the first plurality of n-grams for part-of-speech; means for identifying the first plurality of related entities in response to tagging each entity; and means for scoring each of the first plurality of related entities.

Example 46 includes the subject matter of any of Examples 44 and 45, and wherein the means for identifying the first plurality of related entities comprises means for identifying a verb related to the seed entity; means for identifying an adjective related to the seed entity; means for identifying a noun modifier related to the seed entity; means for identifying a prepositional phrase related to the seed entity; means for identifying a subordinate clause related to the seed entity; means for identifying a modified noun related to the seed entity; means for identifying a conjunction relating a noun to the seed entity; means for identifying a disjunction relating a noun to the seed entity; means for identifying a noun co-occurring with the seed entity; means for identifying a noun controlling a proposition to which the seed entity is subjected; means for identifying a noun controlling a verb with a preposition to which the seed entity is subjected; means for identifying a noun subjected by a verb with a preposition that the seed entity is controlling; means for identifying an adjective that follows the seed entity and uses a "be" auxiliary; or means for identifying a noun that follows the seed entity and uses a "be" auxiliary.

Example 47 includes the subject matter of any of Examples 44-46, and wherein the means for scoring each of the first plurality of related entities comprises means for determining a first number of n-grams in the first plurality of n-grams; means for determining a second number of n-grams in the first plurality of n-grams including a related entity of the first plurality of related entities; and means for determining a web relation frequency as a function of a frequency of the second number of n-grams in the first number of n-grams.

Example 48 includes the subject matter of any of Examples 44-47, and wherein the means for scoring each of the first plurality of related entities comprises means for determining a first number of unique n-grams in the first plurality of n-grams; and means for determining, for each group of related entities in the first plurality of related entities, a second number of unique n-grams in the first plurality of n-grams including an entity of the corresponding group of related entities.

Example 49 includes the subject matter of any of Examples 44-48, and wherein the means for scoring each of the first plurality of related entities comprises means for calculating an indicative segment frequency in the web corpus and a normalized indicative segment frequency in the web corpus for the corresponding related entity.

Example 50 includes the subject matter of any of Examples 44-49, and wherein the means for calculating the indicative segment frequency and the normalized indicative segment frequency comprises means for identifying a plurality of segments including the corresponding related entity, wherein each segment comprises a shortest part of an n-gram of the first plurality of n-grams including the seed entity and the corresponding related entity; and means for identifying a most common segment of the plurality of segments as the indicative segment of the corresponding related entity.

Example 51 includes the subject matter of any of Examples 44-50, and wherein the means for calculating the normalized indicative segment frequency comprises means for determining a probable frequency of occurrence in the web corpus of the entities of the indicative segment of the corresponding related entity; and means for dividing the indicative segment frequency of the corresponding related entity by the probable frequency of occurrence.

Example 52 includes the subject matter of any of Examples 44-51, and wherein the means for analyzing the web corpus using the semantic graph to identify and rank contextual synonyms for entities within the domain comprises means for selecting related entities of the first plurality of related entities having a highest indicative segment normalized frequency as anchor entities; means for retrieving anchor n-grams from the web corpus, wherein each anchor n-gram includes the seed entity and an anchor entity; means for replacing the seed entity of each anchor n-gram with a placeholder; means for retrieving candidate n-grams from the web corpus, wherein each candidate n-gram matches an anchor n-gram; means for identifying entities of the candidate n-grams matching the placeholder of the corresponding anchor n-gram as similarity candidates; and means for scoring each of the similarity candidates based on similarity to the seed entity.

Example 53 includes the subject matter of any of Examples 44-52, and wherein the means for scoring each of the similarity candidates comprises means for generating a contextual similarity score for the corresponding similarity candidate based on contextual features; means for generating a linguistic similarity score for the corresponding similarity candidate based on linguistic features; and means for determining a similarity score for the corresponding similarity candidate as a function of the corresponding contextual similarity score and the corresponding linguistic similarity score.

Example 54 includes the subject matter of any of Examples 44-53, and wherein the means for generating the contextual similarity score for the corresponding similarity candidate comprises means for replacing the seed entity of each anchor n-gram with the corresponding similarity candidate to generate replaced anchor n-grams; means for searching the web corpus for the replaced anchor n-grams using the n-gram index; means for identifying common anchors of the seed entity and the corresponding similarity candidate, wherein the common anchors are included in replaced anchor n-grams found in the web corpus; means for calculating a first ratio of a number of common anchors to a number of anchors of the seed entity; and means for calculating a normalized ratio as a function of the first ratio, a frequency of the corresponding similarity candidate in the web corpus, and a frequency of the seed entity in the web corpus.

Example 55 includes the subject matter of any of Examples 44-54, and wherein the means for generating the linguistic similarity score for the corresponding similarity candidate comprises means for applying a plurality of predefined templates using the seed entity and the corresponding similarity candidate to generate linguistic features; and means for calculating a normalized frequency for each linguistic feature in the corpus.

Example 56 includes the subject matter of any of Examples 44-55, and further including means for adding, by the computing device, the intents, intent patterns, slots, slot patterns, and slot values to a domain model, wherein the domain model includes known intents, intent patters, slots, and slot patterns associated with the domain and an ontology including known slot values associated with the domain.

Example 57 includes the subject matter of any of Examples 44-56, and wherein the means for analyzing the web corpus using the semantic graph to identify the intent patterns in the domain comprises means for scoring a first plurality of verbs of the first plurality of related entities of the semantic graph by a number of group unique n-grams and an indicative segment normalized frequency of the corresponding verb; means for identifying one or more unknown verbs of the first plurality of verbs, wherein each of the unknown verbs does not match an intent pattern of the domain model; means for determining a similarity score for each pair of an unknown verb and a verb of the intent patterns of the domain model; means for identifying one or more similar verbs of the unknown verbs as a function of the corresponding similarity score for the unknown verb and the verb of the intent patterns of the domain model; and means for generating, for each similar verb of the one or more similar verbs, a new intent pattern for the intent of the corresponding intent pattern of the domain model.

Example 58 includes the subject matter of any of Examples 44-57, and wherein the means for analyzing the web corpus using the semantic graph to identify the intents and the intent patterns in the domain comprises means for clustering one or more remaining verbs of the unknown verbs to generate clusters of remaining verbs, wherein each of the remaining verbs is not a similar verb; means for generating, for each cluster of remaining verbs, an intent; and means for generating, for each remaining verb of the clusters of remaining verbs, an intent pattern associated with the intent for the corresponding cluster of remaining verbs.

Example 59 includes the subject matter of any of Examples 44-58, and wherein the means for analyzing the web corpus using the semantic graph to identify the slot values in the domain comprises means for scoring a first plurality of modifiers of the first plurality of related entities of the semantic graph by a number of group unique n-grams and an indicative segment normalized frequency; means for identifying one or more known modifiers of the first plurality of modifiers, wherein each of the known modifiers matches a slot pattern of the domain model; means for identifying one or more unknown slot values of the known modifiers, wherein each of the unknown slot values does not match a slot value of the ontology of the domain model; and means for adding the one or more unknown slot values to the ontology of the domain model.

Example 60 includes the subject matter of any of Examples 44-59, and wherein the first plurality of modifiers comprises an adjective, a modifying noun, a prepositional phrase, or a subordinate clause.

Example 61 includes the subject matter of any of Examples 44-60, and wherein the means for analyzing the web corpus using the semantic graph to identify the slot patterns in the domain comprises means for identifying one or more unknown modifiers of the first plurality of modifiers, wherein each of the unknown modifiers does not match a slot pattern of the domain model; means for identifying one or more first unknown modifiers of the unknown modifiers, wherein each of the first unknown modifiers includes a slot value matching a slot value of the ontology of the domain model; and means for generating, for each of the first unknown modifiers, a new slot pattern for the slot of the corresponding slot value.

Example 62 includes the subject matter of any of Examples 44-61, and wherein the means for analyzing the web corpus using the semantic graph to identify the slot patterns and the slot values in the domain comprises means for identifying one or more second unknown modifiers of the unknown modifiers, wherein each of the second unknown modifiers is not a first unknown modifier; means for determining a similarity score for each pair of a second unknown modifier and a slot value of the ontology; means for identifying one or more similar modifiers of the second unknown modifiers as a function of the corresponding similarity score for the second unknown modifier and the slot value of the ontology; means for generating, for each similar modifier, a new slot pattern for the slot of the corresponding slot value of the ontology; and means for adding, for each similar modifier, a new slot value of the corresponding similar modifier to the ontology.

Example 63 includes the subject matter of any of Examples 44-62, and wherein the means for analyzing the web corpus using the semantic graph to identify the slots, the slot patterns, and the slot values in the domain comprises means for clustering one or more remaining modifiers of the second unknown modifiers to generate clusters of remaining modifiers, wherein each of the remaining modifiers is not a similar modifier; means for generating, for each cluster of remaining modifiers, a slot; means for generating, for each remaining modifier of the clusters of remaining modifiers, a slot pattern associated with the slot for the corresponding cluster of remaining modifiers; and means for adding, for each remaining modifier of the cluster of remaining modifiers, a slot value of the corresponding remaining modifier to the ontology.

The invention claimed is:

1. A computing device for domain model creation, the computing device comprising:
 a web corpus module to access an n-gram index of a web corpus, wherein the web corpus includes a plurality of entities, wherein the n-gram index is indicative of a plurality of n-grams, wherein each n-gram comprises a predetermined number n of consecutive entities in the web corpus, and wherein the n-gram index is further indicative of a plurality of entities of each n-gram and a frequency of each n-gram;
 a semantic graph module to generate a semantic graph of the web corpus using the n-gram index of the web corpus, wherein the semantic graph is rooted by a predefined seed entity and includes a first plurality of related entities, wherein each of the first plurality of related entities is grammatically related to the seed entity and each of the first plurality of related entities is included in a corresponding n-gram of the web corpus that also includes the seed entity, and wherein to generate the semantic graph comprises to:
  retrieve a first plurality of n-grams from the web corpus using the n-gram index, wherein each of the first plurality of n-grams includes the seed entity;
  tag each entity of the first plurality of n-grams for part-of-speech; and
  identify a grammatical relationship between the seed entity and each of the first plurality of related entities in response to tagging of each entity, wherein each of the first plurality of related entities is included in the first plurality of n-grams;
 a similarity discovery module to analyze the web corpus using the semantic graph to identify and rank contextual synonyms for entities within a domain, wherein the semantic graph is further expanded using the ranked contextual synonyms;
 an intent discovery module to analyze the web corpus using the semantic graph to identify intents and intent patterns in the domain, wherein each intent is associated with a domain action, and each intent pattern matches query features and a corresponding intent; and
 a slot discovery module to analyze the web corpus using the semantic graph to identify slots, slot patterns, and slot values in the domain, wherein each slot is associated with a parameter of an intent or an entity, each slot pattern matches query features and a corresponding slot, and each slot value is associated with an entity.

2. The computing device of claim 1, wherein to generate the semantic graph comprises to:
 score each of the first plurality of related entities.

3. The computing device of claim 2, wherein to score each of the first plurality of related entities comprises to:
 determine a first number of n-grams in the first plurality of n-grams;
 determine a second number of n-grams in the first plurality of n-grams that each include a related entity of the first plurality of related entities; and
 determine a web relation frequency as a function of a frequency of the second number of n-grams in the first number of n-grams.

4. The computing device of claim 2, wherein to score each of the first plurality of related entities comprises to calculate an indicative segment frequency in the web corpus and a normalized indicative segment frequency in the web corpus for the corresponding related entity.

5. The computing device of claim 4, wherein to calculate the indicative segment frequency and the normalized indicative segment frequency comprises to:
 identify a plurality of segments including the corresponding related entity, wherein each segment comprises a shortest part of an n-gram of the first plurality of n-grams that includes the seed entity and the corresponding related entity; and
 identify a most common segment of the plurality of segments as the indicative segment of the corresponding related entity.

6. The computing device of claim 5, wherein to calculate the normalized indicative segment frequency comprises to:
 determine a probable frequency of occurrence in the web corpus of the entities of the indicative segment of the corresponding related entity; and
 divide the indicative segment frequency of the corresponding related entity by the probable frequency of occurrence.

7. The computing device of claim 1, wherein to analyze the web corpus using the semantic graph to identify and rank contextual synonyms for entities within the domain comprises to:
 select related entities of the first plurality of related entities having a highest indicative segment normalized frequency as anchor entities;
 retrieve anchor n-grams from the web corpus, wherein each anchor n-gram includes the seed entity and an anchor entity;
 replace the seed entity of each anchor n-gram with a placeholder;
 retrieve candidate n-grams from the web corpus, wherein each candidate n-gram matches an anchor n-gram;

identify entities of the candidate n-grams matching the placeholder of the corresponding anchor n-gram as similarity candidates; and score each of the similarity candidates based on similarity to the seed entity.

8. The computing device of claim 7, wherein to score each of the similarity candidates comprises to:

generate a contextual similarity score for the corresponding similarity candidate based on contextual features;

generate a linguistic similarity score for the corresponding similarity candidate based on linguistic features; and determine a similarity score for the corresponding similarity candidate as a function of the corresponding contextual similarity score and the corresponding linguistic similarity score.

9. The computing device of claim 1, further comprising a domain model module to add the intents, intent patterns, slots, slot patterns, and slot values to a domain model, wherein the domain model includes known intents, intent patters, slots, and slot patterns associated with the domain and an ontology including known slot values associated with the domain.

10. The computing device of claim 9, wherein to analyze the web corpus using the semantic graph to identify the intents and the intent patterns in the domain comprises to:

score a first plurality of verbs of the first plurality of related entities of the semantic graph by a number of group unique n-grams and an indicative segment normalized frequency of the corresponding verb;

identify one or more unknown verbs of the first plurality of verbs, wherein each of the unknown verbs does not match an intent pattern of the domain model;

determine a similarity score for each pair of an unknown verb and a verb of the intent patterns of the domain model;

identify one or more similar verbs of the unknown verbs as a function of the corresponding similarity score for the unknown verb and the verb of the intent patterns of the domain model;

generate, for each similar verb of the one or more similar verbs, a new intent pattern for the intent of the corresponding intent pattern of the domain model;

cluster one or more remaining verbs of the unknown verbs to generate clusters of remaining verbs, wherein each of the remaining verbs is not a similar verb;

generate, for each cluster of remaining verbs, an intent; and generate, for each remaining verb of the clusters of remaining verbs, an intent pattern associated with the intent for the corresponding cluster of remaining verbs.

11. The computing device of claim 9, wherein to analyze the web corpus using the semantic graph to identify the slot values in the domain comprises to:

score a first plurality of modifiers of the first plurality of related entities of the semantic graph by a number of group unique n-grams and an indicative segment normalized frequency;

identify one or more known modifiers of the first plurality of modifiers, wherein each of the known modifiers matches a slot pattern of the domain model;

identify one or more unknown slot values of the known modifiers, wherein each of the unknown slot values does not match a slot value of the ontology of the domain model; and add the one or more unknown slot values to the ontology of the domain model.

12. The computing device of claim 11, wherein to analyze the web corpus using the semantic graph to identify the slots, the slot patterns, and the slot values in the domain comprises to:

identify one or more unknown modifiers of the first plurality of modifiers, wherein each of the unknown modifiers does not match a slot pattern of the domain model;

identify one or more first unknown modifiers of the unknown modifiers, wherein each of the first unknown modifiers includes a slot value matching a slot value of the ontology of the domain model;

generate, for each of the first unknown modifiers, a new slot pattern for the slot of the corresponding slot value;

identify one or more second unknown modifiers of the unknown modifiers, wherein each of the second unknown modifiers is not a first unknown modifier;

determine a similarity score for each pair of a second unknown modifier and a slot value of the ontology;

identify one or more similar modifiers of the second unknown modifiers as a function of the corresponding similarity score for the second unknown modifier and the slot value of the ontology;

generate, for each similar modifier, a new slot pattern for the slot of the corresponding slot value of the ontology;

add, for each similar modifier, a new slot value of the corresponding similar modifier to the ontology;

cluster one or more remaining modifiers of the second unknown modifiers to generate clusters of remaining modifiers, wherein each of the remaining modifiers is not a similar modifier;

generate, for each cluster of remaining modifiers, a slot;

generate, for each remaining modifier of the clusters of remaining modifiers, a slot pattern associated with the slot for the corresponding cluster of remaining modifiers; and add, for each remaining modifier of the cluster of remaining modifiers, a slot value of the corresponding remaining modifier to the ontology.

13. A method for domain model creation, the method comprising:

generating, by a computing device, a semantic graph of a web corpus using an n-gram index of the web corpus, wherein the web corpus includes a plurality of entities, wherein the n-gram index is indicative of a plurality of n-grams, wherein each n-gram comprises a predetermined number n of consecutive entities in the web corpus, and wherein the n-gram index is further indicative of a plurality of entities of each n-gram and a frequency of each n-gram, and wherein the semantic graph is rooted by a predefined seed entity and includes a first plurality of related entities, wherein each of the first plurality of related entities is grammatically related to the seed entity and each of the first plurality of related entities is included in a corresponding n-gram of the web corpus that also includes the seed entity, wherein generating the semantic graph comprises:

retrieving a first plurality of n-grams from the web corpus using the n-gram index, wherein each of the first plurality of n-grams includes the seed entity;

tagging each entity of the first plurality of n-grams for part-of-speech; and identifying a grammatical relationship between the seed entity and each of the first plurality of related entities in response to tagging each entity, wherein each of the first plurality of related entities is included in the first plurality of n-grams;

analyzing, by the computing device, the web corpus using the semantic graph to identify and rank contextual synonyms for entities within a domain, wherein the semantic graph is further expanded using the ranked contextual synonyms;

analyzing, by the computing device, the web corpus using the semantic graph to identify intents and intent patterns in the domain, wherein each intent is associated with a domain action, and each intent pattern matches query features and a corresponding intent; and analyzing, by the computing device, the web corpus using the semantic graph to identify slots, slot patterns, and slot values in the domain, wherein each slot is associated with a parameter of an intent or an entity, each slot pattern matches query features and a corresponding slot, and each slot value is associated with an entity.

14. The method of claim 13, wherein generating the semantic graph comprises:
scoring each of the first plurality of related entities.

15. The method of claim 13, wherein analyzing the web corpus using the semantic graph to identify and rank contextual synonyms for entities within the domain comprises:
selecting related entities of the first plurality of related entities having a highest indicative segment normalized frequency as anchor entities;
retrieving anchor n-grams from the web corpus, wherein each anchor n-gram includes the seed entity and an anchor entity;
replacing the seed entity of each anchor n-gram with a placeholder;
retrieving candidate n-grams from the web corpus, wherein each candidate n-gram matches an anchor n-gram;
identifying entities of the candidate n-grams matching the placeholder of the corresponding anchor n-gram as similarity candidates; and
scoring each of the similarity candidates based on similarity to the seed entity.

16. The method of claim 15, wherein scoring each of the similarity candidates comprises:
generating a contextual similarity score for the corresponding similarity candidate based on contextual features;
generating a linguistic similarity score for the corresponding similarity candidate based on linguistic features; and
determining a similarity score for the corresponding similarity candidate as a function of the corresponding contextual similarity score and the corresponding linguistic similarity score.

17. The method of claim 13, further comprising adding, by the computing device, the intents, intent patterns, slots, slot patterns, and slot values to a domain model, wherein the domain model includes known intents, intent patterns, slots, and slot patterns associated with the domain and an ontology including known slot values associated with the domain.

18. The method of claim 17, wherein analyzing the web corpus using the semantic graph to identify the intents and the intent patterns in the domain comprises:
scoring a first plurality of verbs of the first plurality of related entities of the semantic graph by a number of group unique n-grams and an indicative segment normalized frequency of the corresponding verb;
identifying one or more unknown verbs of the first plurality of verbs, wherein each of the unknown verbs does not match an intent pattern of the domain model;

determining a similarity score for each pair of an unknown verb and a verb of the intent patterns of the domain model;
identifying one or more similar verbs of the unknown verbs as a function of the corresponding similarity score for the unknown verb and the verb of the intent patterns of the domain model;
generating, for each similar verb of the one or more similar verbs, a new intent pattern for the intent of the corresponding intent pattern of the domain model;
clustering one or more remaining verbs of the unknown verbs to generate clusters of remaining verbs, wherein each of the remaining verbs is not a similar verb;
generating, for each cluster of remaining verbs, an intent; and
generating, for each remaining verb of the clusters of remaining verbs, an intent pattern associated with the intent for the corresponding cluster of remaining verbs.

19. One or more non-transitory, computer-readable storage media comprising a plurality of instructions that in response to being executed cause a computing device to:
generate a semantic graph of a web corpus using an n-gram index of the web corpus, wherein the web corpus includes a plurality of entities, wherein the n-gram index is indicative of a plurality of n-grams, wherein each n-gram comprises a predetermined number n of consecutive entities in the web corpus, and wherein the n-gram index is indicative of a plurality of entities of each n-gram and a frequency of each n-gram, and wherein the semantic graph is rooted by a predefined seed entity and includes a first plurality of related entities, wherein each of the first plurality of related entities is grammatically related to the seed entity and each of the first plurality of related entities is included in a corresponding n-gram of the web corpus that also includes the seed entity, wherein to generate the semantic graph comprises to:
retrieve a first plurality of n-grams from the web corpus using the n-gram index, wherein each of the first plurality of n-grams includes the seed entity;
tag each entity of the first plurality of n-grams for part-of-speech; and
identify a grammatical relationship between the seed entity and each of the first plurality of related entities in response to tagging each entity, wherein each of the first plurality of related entities is included in the first plurality of n-grams;
analyze the web corpus using the semantic graph to identify and rank contextual synonyms for entities within a domain, wherein the semantic graph is further expanded using the ranked contextual synonyms;
analyze the web corpus using the semantic graph to identify intents and intent patterns in the domain, wherein each intent is associated with a domain action, and each intent pattern matches query features and a corresponding intent; and
analyze the web corpus using the semantic graph to identify slots, slot patterns, and slot values in the domain, wherein each slot is associated with a parameter of an intent or an entity, each slot pattern matches query features and a corresponding slot, and each slot value is associated with an entity.

20. The one or more non-transitory, computer-readable storage media of claim 19, wherein to generate the semantic graph comprises to:
score each of the first plurality of related entities.

21. The one or more non-transitory, computer-readable storage media of claim 19, wherein to analyze the web corpus using the semantic graph to identify and rank contextual synonyms for entities within the domain comprises to:

select related entities of the first plurality of related entities having a highest indicative segment normalized frequency as anchor entities;

retrieve anchor n-grams from the web corpus, wherein each anchor n-gram includes the seed entity and an anchor entity;

replace the seed entity of each anchor n-gram with a placeholder;

retrieve candidate n-grams from the web corpus, wherein each candidate n-gram matches an anchor n-gram;

identify entities of the candidate n-grams matching the placeholder of the corresponding anchor n-gram as similarity candidates; and score each of the similarity candidates based on similarity to the seed entity.

22. The one or more non-transitory, computer-readable storage media of claim 21, wherein to score each of the similarity candidates comprises to:

generate a contextual similarity score for the corresponding similarity candidate based on contextual features;

generate a linguistic similarity score for the corresponding similarity candidate based on linguistic features; and determine a similarity score for the corresponding similarity candidate as a function of the corresponding contextual similarity score and the corresponding linguistic similarity score.

23. The one or more non-transitory, computer-readable storage media of claim 19, further comprising a plurality of instructions that in response to being executed cause the computing device to add the intents, intent patterns, slots, slot patterns, and slot values to a domain model, wherein the domain model includes known intents, intent patters, slots, and slot patterns associated with the domain and an ontology including known slot values associated with the domain.

24. The one or more non-transitory, computer-readable storage media of claim 23, wherein to analyze the web corpus using the semantic graph to identify the intents and the intent patterns in the domain comprises to:

score a first plurality of verbs of the first plurality of related entities of the semantic graph by a number of group unique n-grams and an indicative segment normalized frequency of the corresponding verb;

identify one or more unknown verbs of the first plurality of verbs, wherein each of the unknown verbs does not match an intent pattern of the domain model;

determine a similarity score for each pair of an unknown verb and a verb of the intent patterns of the domain model;

identify one or more similar verbs of the unknown verbs as a function of the corresponding similarity score for the unknown verb and the verb of the intent patterns of the domain model;

generate, for each similar verb of the one or more similar verbs, a new intent pattern for the intent of the corresponding intent pattern of the domain model;

cluster one or more remaining verbs of the unknown verbs to generate clusters of remaining verbs, wherein each of the remaining verbs is not a similar verb;

generate, for each cluster of remaining verbs, an intent; and generate, for each remaining verb of the clusters of remaining verbs, an intent pattern associated with the intent for the corresponding cluster of remaining verbs.

25. The one or more non-transitory, computer-readable storage media of claim 23, wherein to analyze the web corpus using the semantic graph to identify the slots, the slot patterns, and the slot values in the domain comprises to:

score a first plurality of modifiers of the first plurality of related entities of the semantic graph by a number of group unique n-grams and an indicative segment normalized frequency;

identify one or more known modifiers of the first plurality of modifiers, wherein each of the known modifiers matches a slot pattern of the domain model;

identify one or more unknown slot values of the known modifiers, wherein each of the unknown slot values does not match a slot value of the ontology of the domain model;

add the one or more unknown slot values to the ontology of the domain model;

identify one or more unknown modifiers of the first plurality of modifiers, wherein each of the unknown modifiers does not match a slot pattern of the domain model;

identify one or more first unknown modifiers of the unknown modifiers, wherein each of the first unknown modifiers includes a slot value matching a slot value of the ontology of the domain model;

generate, for each of the first unknown modifiers, a new slot pattern for the slot of the corresponding slot value;

identify one or more second unknown modifiers of the unknown modifiers, wherein each of the second unknown modifiers is not a first unknown modifier;

determine a similarity score for each pair of a second unknown modifier and a slot value of the ontology;

identify one or more similar modifiers of the second unknown modifiers as a function of the corresponding similarity score for the second unknown modifier and the slot value of the ontology;

generate, for each similar modifier, a new slot pattern for the slot of the corresponding slot value of the ontology;

add, for each similar modifier, a new slot value of the corresponding similar modifier to the ontology;

cluster one or more remaining modifiers of the second unknown modifiers to generate clusters of remaining modifiers, wherein each of the remaining modifiers is not a similar modifier;

generate, for each cluster of remaining modifiers, a slot;

generate, for each remaining modifier of the clusters of remaining modifiers, a slot pattern associated with the slot for the corresponding cluster of remaining modifiers; and add, for each remaining modifier of the cluster of remaining modifiers, a slot value of the corresponding remaining modifier to the ontology.

* * * * *